US008868069B2

(12) United States Patent
Bennett et al.

(10) Patent No.: US 8,868,069 B2
(45) Date of Patent: Oct. 21, 2014

(54) AIRLINER-MOUNTED CELLULAR BASE STATION

(75) Inventors: Steven John Bennett, Coquitlam (CA); Gerald Gustav Vos, Surrey (CA)

(73) Assignee: Sierra Wireless, Inc., Richmond, British Columbia (CA)

( * ) Notice: Subject to any disclaimer, the term of this patent is extended or adjusted under 35 U.S.C. 154(b) by 284 days.

(21) Appl. No.: 13/482,255

(22) Filed: May 29, 2012

(65) Prior Publication Data

US 2013/0324070 A1 Dec. 5, 2013

(51) Int. Cl.
*H04W 4/00* (2009.01)
*H04B 7/185* (2006.01)
*H04B 7/15* (2006.01)
*H04B 7/00* (2006.01)
*H04W 24/00* (2009.01)
*H04W 40/00* (2009.01)
*H04B 1/38* (2006.01)
*H04B 1/06* (2006.01)
*H04B 1/00* (2006.01)
*H04B 7/204* (2006.01)
*H04B 7/216* (2006.01)
*H04L 12/66* (2006.01)

(52) U.S. Cl.
USPC ......... 455/431; 455/11.1; 455/12.1; 455/446; 455/456.4; 455/345; 455/522; 455/560; 455/561; 455/63.4; 370/316; 370/319; 370/329; 370/335; 370/338; 370/352

(58) Field of Classification Search
CPC ....... H04W 4/02; H04W 24/00; H04W 64/00; H04W 4/027
USPC ............... 455/404, 431, 445, 12.1, 11.1, 345, 455/522, 60, 427, 456.1, 63.4, 446, 4, 44, 455/561, 560, 428, 453; 370/316, 208, 338, 370/319, 335, 329
See application file for complete search history.

(56) References Cited

U.S. PATENT DOCUMENTS 2,883,656 A * 4/1959 Russell .......................... 342/160
5,367,306 A * 11/1994 Hollon et al. ................. 342/386
(Continued)

OTHER PUBLICATIONS

"Channel Estimation and Prediction in UMTS LTE", Aalborg University, Institute of Electronic Systems Signal and Information Processing for Communications.
(Continued)

*Primary Examiner* — Inder Mehra
(74) *Attorney, Agent, or Firm* — Vedder Price P.C.; Thomas J. Kowalski; Rebecca G. Rudich

(57) ABSTRACT

An aircraft-mounted base transceiver station (mBTS) for providing intermittent coverage in a cellular radio network. The mBTS utilizes the existing protocol of its terrestrial counterparts, thereby avoiding dual-mode devices and enabling common usage of terminal monitoring and device management systems for devices connected to a single radio access network even when outside terrestrial coverage areas. The aircraft follows a transient flight pattern, providing intermittent flyover connectivity for remote radio device such as machine-type devices. Connectivity may be store and forward. Channel usage may be adjusted to avoid interfering with terrestrial communication cells during flyover. Doppler effects due to aircraft speed may be accounted for. The mBTS may be configured to service in-range radio devices which are outside a Doppler-inhibited region and/or to prioritize communication with devices based on expected time outside the Doppler-inhibited region. An aircraft mounted antenna may have a radiation pattern focused toward devices outside the Doppler-inhibited region.

41 Claims, 13 Drawing Sheets

(56) References Cited

U.S. PATENT DOCUMENTS

| | | | |
|---|---|---|---|
| 5,515,378 | A | 5/1996 | Roy, III et al. |
| 6,285,878 | B1 | 9/2001 | Lai |
| 6,507,739 | B1 | 1/2003 | Gross et al. |
| 6,603,967 | B1 | 8/2003 | Sinivaara et al. |
| 6,675,013 | B1 | 1/2004 | Gross et al. |
| 6,788,935 | B1 | 9/2004 | McKenna et al. |
| 6,963,292 | B1 * | 11/2005 | White .......................... 340/963 |
| 7,006,816 | B2 | 2/2006 | Remy |
| 7,421,276 | B2 * | 9/2008 | Steer et al. ................ 455/456.1 |
| 7,460,866 | B2 | 12/2008 | Salkini et al. |
| 7,715,838 | B2 | 5/2010 | Swensen et al. |
| 7,957,734 | B2 | 6/2011 | Salkini et al. |
| 8,599,956 | B1 * | 12/2013 | Mitchell ...................... 375/285 |
| 2004/0102191 | A1 | 5/2004 | Pewitt et al. |
| 2006/0009262 | A1 | 1/2006 | Hamm |
| 2007/0281705 | A1 | 12/2007 | Bosenbecker |
| 2008/0274734 | A1 * | 11/2008 | Kostanic et al. ............. 455/431 |
| 2009/0023458 | A1 * | 1/2009 | Mountney ................. 455/456.1 |
| 2009/0221285 | A1 | 9/2009 | Dobosz |
| 2010/0142966 | A1 * | 6/2010 | Erdos et al. .................. 398/128 |
| 2010/0304739 | A1 | 12/2010 | Rooks et al. |
| 2011/0125348 | A1 * | 5/2011 | Sandell et al. ................. 701/14 |
| 2011/0134889 | A1 * | 6/2011 | Harvey et al. ................ 370/335 |
| 2011/0319084 | A1 * | 12/2011 | Meshkati et al. ............. 455/436 |
| 2012/0270531 | A1 * | 10/2012 | Wright et al. ................ 455/419 |

OTHER PUBLICATIONS

"Huawei High-Speed Railway Communication (HRC) Solution", Huawei's HRC Solution, Huawei Enterprise Business.
Propagation Channel Models 2009-2011, Steepest Ascent Ltd.
Wang, Qi et al., "Carrier Frequency Synchronization in the Downlink of 3GPP LTE", The 21st Annual IEEE International Symposium on Personal, Indoor and Mobile Radio Communications (PIMRC'10).
Zyren, Jim, "Overview of the 3GPP Long Term Evolution Physical Layer", Document No. 3GPPEVOLUTIONWP, Jul. 2007.
3GPP TSG-RAN4 Meeting #47bis, Munich, Germany Jun. 16-20, 2008.
3GPP TSG-RAN WG4 Meeting #48, Jeju Island, South Korea, Aug. 18-22, 2008.

* cited by examiner

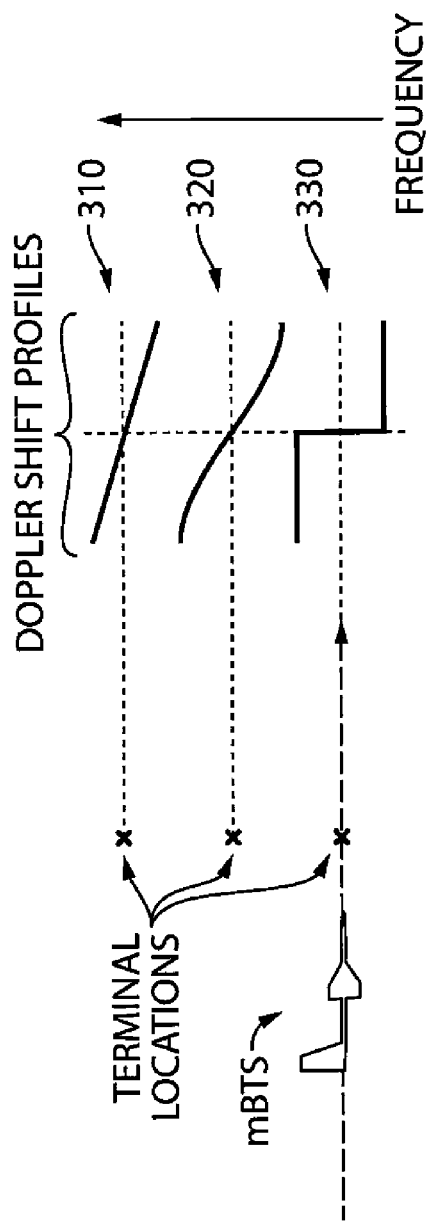
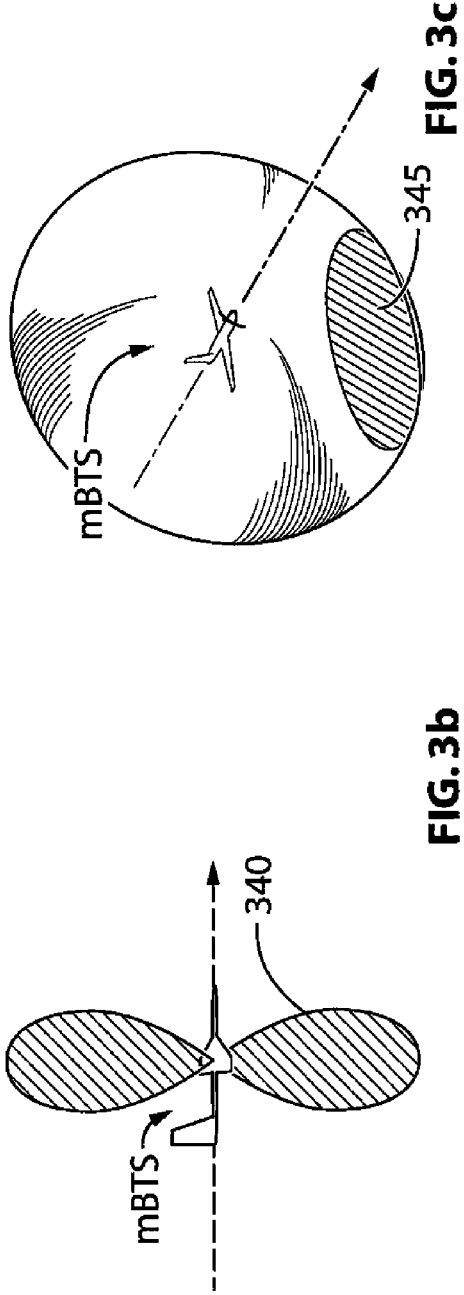
FIG. 3a
FIG. 3b
FIG. 3c

FREQUENCY OFFSETS OF mBTS

AIRLINER-MOUNTED CELLULAR BASE STATION

BACKGROUND OF THE INVENTION

Embodiments of the present invention relate to cellular radio communications and in particular to cellular base stations mounted on an aircraft such as an airliner.

Cellular radio communication networks are a common means for providing communication connectivity to and between mobile devices, such as cellular telephones, computers, and remote machine-type devices such as smart meters, autonomous sensors and actuators, and the like. However, economic considerations are such that current cellular networks provide coverage only where demand is high. There are still large remote areas in which cellular network coverage is poor, patchy, or non-existent.

Satellite-based communication networks have been developed which offer coverage even in remote outdoor areas. However, such networks require specialized mobile devices with relatively strong signal transmission capabilities for operation.

Meteor scatter communications has been used in various applications, wherein signals are reflected off ionized meteor trails. This method has been used to facilitate communication with devices in remote areas. However, implementation requires specialized devices and/or algorithms adapted to take advantage of the nature of the ion trails. Small amounts of data can be transferred during brief instants, spaced at irregular intervals of time. This is useful in some applications. In some implementations of the technology the transmitter must repeat a transmission many times before successfully communicating. The power required must be sufficient to cover a long distance path. This may not be practical or economical when the power source is limited.

Balloon mounted and light-aircraft mounted cellular base stations have been proposed, which orbit or remain substantially stationary over a particular area to provide cellular coverage. However, these solutions require the expense of a dedicated airborne platform, which may be cost-prohibitive, particularly given the sparse demand in many remote areas.

U.S. Pat. No. 7,715,838 discloses a communication system comprising a plurality of commercial aircraft, each including on-board equipment for supporting wireless communications with dual mode handsets. The handsets may be on board the aircraft or on the ground within the aircraft field of view. The resulting wireless communication service can be a cellular-type service operating in frequency bands that are not allocated to other terrestrial cellular systems. However, such a network is completely separate from terrestrial networks, and again requires dedicated handsets. Additionally, the complete geographic coverage suggested would require extensive deployment and coordination of a large number of aircraft and communication equipment.

U.S. Pat. No. 6,285,878 discloses mounting relay stations aboard commercial airline aircraft to form a chain of airborne repeaters providing broadband wireless communication gateways along the entire flight path. Overboard customers along line-of-sight ranges of the flight path can be serviced. However, this approach again requires extensive deployment and coordination of a large number of aircraft and communication equipment. In addition, there is limited technical discussion of how communication between the airborne relay station and overboard customers is to be achieved.

Therefore there is a need for a means for extending cellular service coverage that is not subject to one or more limitations of the prior art.

This background information is provided for the purpose of making known information believed by the applicant to be of possible relevance to the present technology. No admission is necessarily intended, nor should be construed, that any of the preceding information constitutes prior art against the present technology.

SUMMARY OF THE INVENTION

Accordingly, the present invention is directed to Airliner-Mounted Cellular Base Station that obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, in one embodiment, a mobile base transceiver station configured to operate as part of a cellular communication network comprising plural terrestrial base transceiver stations and plural terrestrial radio devices, the terrestrial radio devices configured for communication with the mobile base transceiver station and the terrestrial base transceiver stations via a common predetermined protocol, the mobile base transceiver station mounted aboard an aircraft.

In another aspect of the present invention, a method for operating a mobile base transceiver station includes configuring the mobile base transceiver station to operate as part of a cellular communication network, the cellular communication network further comprising plural terrestrial base transceiver stations and plural terrestrial radio devices, the terrestrial radio devices configured for communication with the mobile base transceiver station and the terrestrial base transceiver stations via a common predetermined protocol; and mounting the mobile base transceiver station aboard an aircraft.

In accordance with another aspect of the present technology, there is provided a method for operating a mobile base transceiver station, the method comprising: configuring the mobile base transceiver station to operate as part of a cellular communication network, the cellular communication network further comprising plural terrestrial base transceiver stations and plural terrestrial radio devices, the terrestrial radio devices configured for communication with the mobile base transceiver station and the terrestrial base transceiver stations via a common predetermined protocol; and mounting the mobile base transceiver station aboard an aircraft.

It is to be understood that both the foregoing general description and the following detailed description are exemplary and explanatory only, and are not restrictive of the invention as claimed.

BRIEF DESCRIPTION OF THE DRAWINGS

These and other features of the technology will become more apparent in the following detailed description in which reference is made to the appended drawings.

FIG. 3a illustrates rates of change of Doppler shift for different terminal locations, in accordance with embodiments of the present technology.

FIG. 3b illustrates a cross-sectional view of a region within which the Doppler shift changes at a rate which is beyond tracking, in accordance with embodiments of the present technology.

FIG. 3c illustrates a perspective view of the region of FIG. 3b, and its potential intersection with ground, in accordance with embodiments of the present technology.

DETAILED DESCRIPTION OF THE INVENTION

Figure 1:
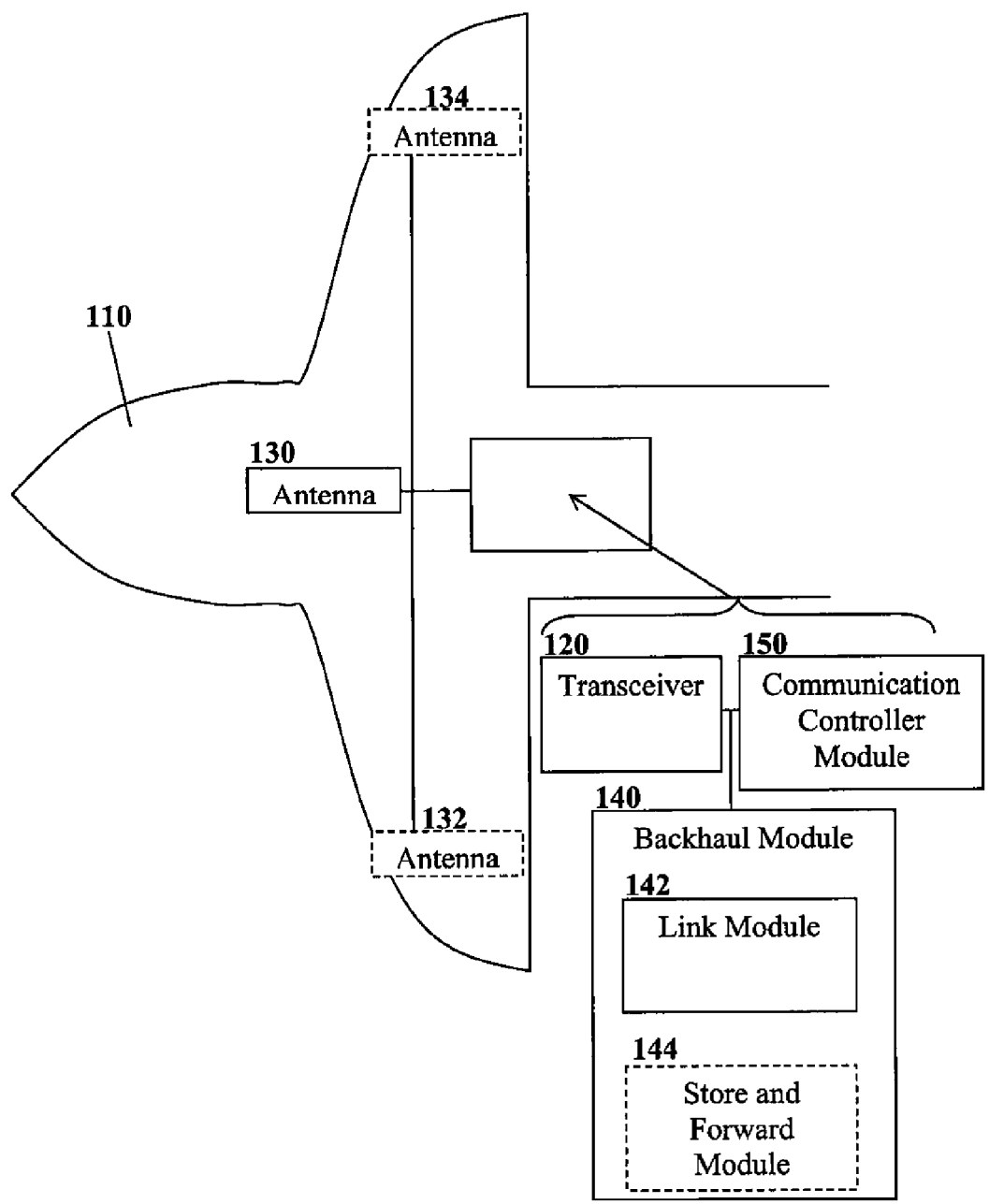
FIG. 1 illustrates a mobile Base Transceiver Station (mBTS) in accordance with embodiments of the technology.

Reference will not be made in detail to embodiments of the present invention with reference to the accompanying figures.

The term "airliner" refers to an aircraft, such as a fixed-wing airplane, which typically follows a relatively efficient flight path from one airport to another. An airliner's flight path is determined in accordance with its primary purpose, which is a purpose other than operating as an airborne communication platform. For example, the airliner's primary purpose may relate to transportation of cargo and/or passengers between airports. Other primary purposes include patrolling, surveying, pleasure, civil service, traffic or weather monitoring, military purposes, and the like.

The term "transient flight pattern" refers to a flight path, executed by an aircraft, which is substantially non-orbital in nature. For example, an aircraft executing a transient flight pattern may appear at a first point on the horizon and follow a generally straight or gently curved path to another point on the horizon, for example opposite the first point. On a broader level, an aircraft executing a transient flight pattern may take off from a first airport and follow a generally straight or gently curved path to another airport. The transient flight pattern provides efficient point-to-point transportation, rather than being designed to circle overhead of a particular region, for example.

The term "cellular network" relates to a radio communication network comprising a plurality of base transceiver stations and radio devices, such as mobile radio devices. A common protocol is used for communication between each radio device and the plurality of base transceiver stations. Communication is subject to restrictions such as radio range restrictions, and each radio device typically communicates with one base transceiver station at a time. Communication with different devices of the cellular network may be performed via different channels or frequency bands associated with the common protocol.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this technology belongs.

An aspect of the present technology provides a mobile, aircraft-mounted base transceiver station (mBTS) configured to operate as part of a cellular communication network. The cellular communication network also comprises plural terrestrial base transceiver stations (tBTS) and plural terrestrial radio devices. In particular, the terrestrial radio devices configured for communication with the mobile base transceiver station and the terrestrial base transceiver stations via a common predetermined protocol. Thus, the mBTS may provide an extension to the cellular communication network, rather than a separate entity. For example, terrestrial radio devices may not be aware of whether they are currently connected to a tBTS or a mBTS, unless they are specially configured for such awareness. Using existing cellular communications protocols may be more economical, since the terrestrial radio devices are simplified, and several components of the mBTS may be "off the shelf".

In embodiments of the present technology, the aircraft executes a substantially transient flight pattern, for example that of a commercial airliner. Thus, in some embodiments, the mBTS may provide transient flyover connectivity to one or more remote terrestrial radio devices, such as machine-type (machine-to-machine) devices. In some embodiments, the mBTS is configured to facilitate store-and-forward communication with at least one of the terrestrial radio devices. For example, a message stored in memory onboard the aircraft may be transmitted to a terrestrial radio device during flyover, and/or a message received from a terrestrial radio device during flyover may be stored in memory and later forwarded to an intended recipient, for example upon aircraft landing or flyover of a communication node or network. Store-and-forward communication may be useful for servicing delay-tolerant and/or low data volume communications. For example, readings from remote wireless utility meters may fall into this category.

In embodiments, it is intended that the same equipment normally used in a terrestrial cellular network can also be used for the terrestrial radio devices communicating with the mBTS as described herein. This is an advantage relative to systems that require special radio equipment. Using common cellular terminals, such as consumer-grade cell phones or related devices, offers lower cost due to the economies of volume production. It also allows emergency communication for normal cellular mobile phones.

Terrestrial cellular networks and equipment are generally engineered and optimised to work in their expected environment with respect to radio propagation. In particular there are generally limits set on expected range due to the radio link budget. This is mainly specified in terms relating to signal intelligibility and delay. There may also be limits on allowable frequency offset due to the Doppler shift induced by relative motion between a base station and terminals. The equipment used may also be unable to tolerate rapid changes in frequency due to variations in Doppler shift. The equipment may also be unable to tolerate more than a predetermined amount of Doppler spread. Doppler spread may relate, for example, to the maximum range of images of the same signal with different Doppler frequencies due to the effects of reflections of the signal and movement of the equipment or objects in the radio propagation paths. Embodiments of the present technology may be configured in response to at least some of these limitations.

Quantifying the various limitations and their combined effects on the expected coverage area of an airborne mBTS is dependent on the radio access protocol, the distance between the mBTS and a terminal to be in communication therewith, and the relative speed between the mBTS and the terminal. An envisioned scenario for operation of a mBTS is in an aircraft at full cruising altitude and speed. This can correspond to a likely situation at locations distant from terrestrial network coverage because terrestrial coverage will usually be available at major airports and therefore the mBTS will not be used when the aircraft is lower and moving slower. For the purposes of the following examples, a nominal highest operating altitude for current design sub-sonic airliners, that is around 43,000 feet, or approximately 13,000 m, is used. This corresponds to characteristics of aircraft such as the Boeing 787 Dreamliner™. The maximum distance between the mBTS and terrestrial stations will be limited by the radio link budget, that is normally defined by the signal to noise or interference ratio and propagation delay time. A typical limit for a WCDMA system on the ground is about 30 km. Part of this limit is based on available power, and part on non-line of sight propagation due to obstructions and the curvature of the earth. Another part of the limit is defined by propagation delay and how that is accommodated in the structure of the physical layer of the radio access protocol and how it shares resources between multiple users. Various standard link budget considerations will be readily understood by a worker skilled in the art. When the mBTS is at 13,000 m height this limits the coverage to the intersection of the ground and a sphere with a radius of the maximum communication distance centered on the mBTS. The line of sight to a sea level horizon at 13,000 m altitude is over 400 km. This height advantage can significantly extend the range of low power radio communications. In practice the signal to noise and interference ratio and delay timing issues may limit the range to less than this. If the reliable terrestrial limit of 30 km is used as a nominal reference for defining a practical reliable communications range, then a 30 km radius sphere around an aircraft, when intersected with an approximately flat ground surface, induces a circle of about 54 km diameter on the ground. Given the same 30 km range limit, if the ground height is significantly above sea level or the aircraft is lower, the ground circle coverage actually increases. For example, if the aircraft is at 8300 m above an area where ground level is 1500 m, as it is in Colorado, USA, for example, then the circle projected on the ground will be about 58.5 km in diameter. The terrain profile will also affect coverage when causing shadowing, for example, when there are mountains. The above-described range limitations are illustrative but not necessarily limiting to the presently claimed technology.

Figure 2A:
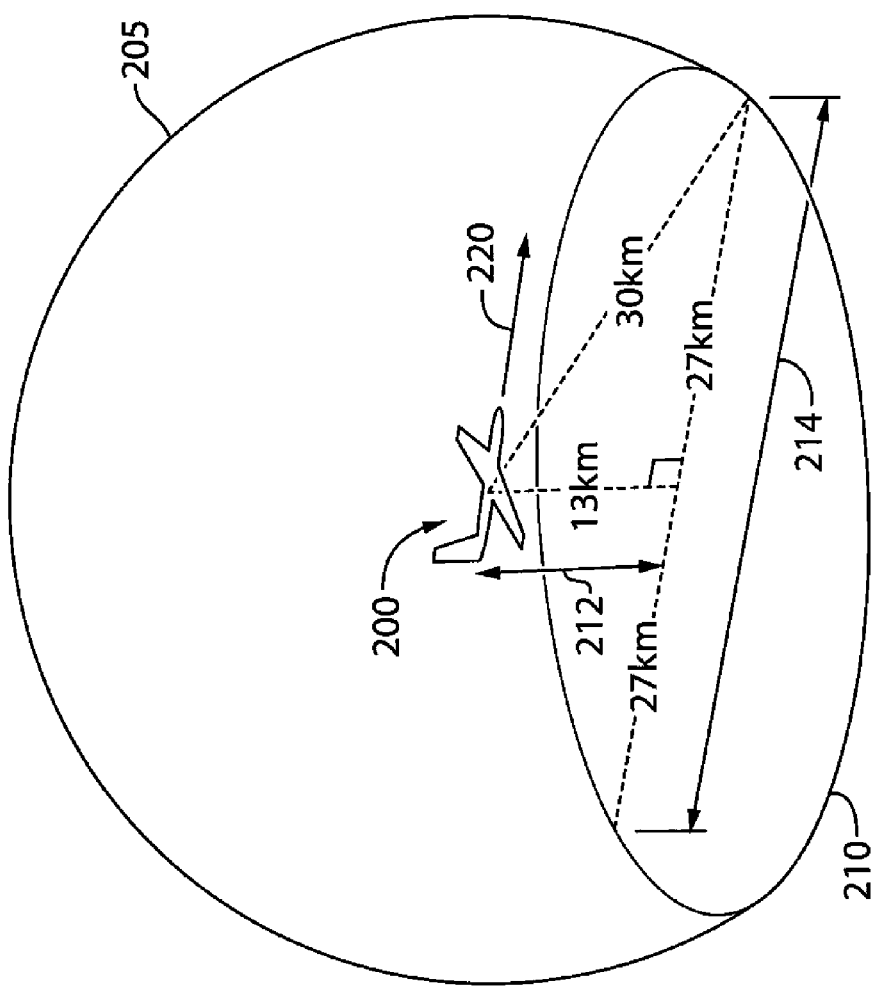
FIG. 2a illustrates the range of an mBTS in accordance with an example scenario of the present technology.

FIG. 2a illustrates the above scenario, where a sphere 205 of radius 30 km, representing the practical communication range from an aircraft-mounted mBTS 200 intersects the ground to form a circle 210 on the ground. The mBTS in the present example is at an altitude 212 of 13 km, giving the circle a diameter 214 of about 54 km. A line 220 represents the current direction of motion of the mBTS.

The transit time of the aircraft over a ground location will limit the amount of time that a terrestrial radio device, at that ground location, has available to discover the mBTS, make a connection and transfer a message. Continuing with the example of 13,000 m height above terrain and a 30 km range, on a direct pass overhead over the ground location at a speed of 900 km/h the transit time available is about 3 minutes and 36 seconds (the time taken to travel 54 km). If the ground location is offset from the aircraft ground track by a distance of 10 km, the transit time is about 3¼ minutes, and at 20 km offset it is about 2¼ minutes. Due to other limitations as will be detailed below, the available communication time may be different from the transit, "in range" time. The time taken for a terminal to discover an mBTS is dependent on several factors including the radio access method, the protocol and also whether the terminal is capable of or set to search multiple protocols in multiple bands and frequencies. A subscriber "world phone" handset may have the ability to search many bands and protocols. Depending on how fast it can do this there might not be sufficient time to find and acquire the mBTS. A M2M terminal or subscriber handset may be configured for preferential mBTS use, for example by software alone. For example, the terminal or handset may be configured to execute a mode of operation which limits signal search and discovery operations to one protocol, one band and even a limited number of channels known to be offered for the service. This does not require hardware changes. In some embodiments, in the absence of apparent terrestrial coverage or by use of a GPS location and a database of known terrestrial coverage, a terminal or phone may be configured to automatically enter a mode of operation optimised for communication via mBTS service. This would enable more time for M2M data transfer, or an emergency call from a handset. Using the example of the WCDMA system, the time needed to search one band and connect to a mBTS is about 45 seconds. Following that, the time needed for a short M2M data transfer may be less than one second. Thus, as long as an mBTS is within feasible range for at least 45 seconds, data transfer may be possible, and short voice calls may also be possible. The terminal or handset may be configured to execute the data transfer or voice call as soon as it is connected to the mBTS.

The maximum velocity difference between a terminal and mBTS will, in some embodiments, be about 800 km/h to 900 km/h, assuming a stationary ground based terminal. The following formula may be used to calculate the apparent frequency $f_r$ seen by a receiver moving relative to a transmitter transmitting at frequency $f_t$, where c is the speed of light in the relevant media and v is the relative velocity of the transmitter and the receiver, measured along a line between the two:

$$f_r = (1 \pm v/c) f_t \qquad (1)$$

From the above, it can be calculated that, in the 900 MHz cellular band, the relative velocity causes a Doppler shift of about +/−750 Hz and in the 2.1 GHz band the Doppler shift is about +/−1,750 Hz. (The Doppler shift is the difference $f_r-f_t$; the positive value is realized when the transmitter and receiver are moving toward each other and the negative value is realized when they are moving away from each other.) The maximum relative velocity v, and hence the maximum Doppler shift, is experienced for communication with terminals directly in-line with the track of the mBTS. Terminals to the side of the mBTS track experience a lesser Doppler shift. Most cellular wireless protocols are not specifically designed to accommodate this high amount of frequency shift; they are more typically designed to meet the needs of stationary terminals or ones installed in surface vehicles travelling below about 130 km/h. In a few cases speeds of up to 300 km/h may be accommodated by existing protocols. For example, this speed has been specified for a release of the LTE standard. Operation of terminals moving at high speeds relative to fixed base stations is usually possible at a lower data transfer rate than the maximum available to stationary and slow moving users. Such operation is enabled by methods as would be readily understood by a worker skilled in the art. The reason for the data transfer rate limitation is not entirely the frequency shift due to the relative motion. Rather, in the normal terrestrial propagation environment, the rapidly changing channel conditions caused by the combination of multiple changing specular reflections is a principal impairment of the signal. This impairment results from a range of Doppler shifted and delayed components of the transmitted signal that are rapidly changing in composition and magnitude. The principle of how Doppler spread occurs can be elucidated in the following example. For a vehicle approaching a base station, there may be a direct line-of-sight signal with a positive frequency offset and a reflected signal from a reflective object such as a building, behind the vehicle that has a negative offset. The combination and interaction of the components as received superimposed on each other reduces intelligibility of the signals by causing the transmitted information carrying modulation to have rapidly changing pseudo-random phase and magnitude modulation imposed upon it. Such conditions are typically associated with multipath fading.

In contrast the air to ground path may be more likely to have a two-ray propagation characteristic due to the interaction of a direct path and a ground reflected path. This typically results in a more benign, position dependent, flat fading propagation characteristic and less Doppler spread. Although this can result in signal cancellation for short time intervals it is often simpler for receivers to accommodate than the terrestrial propagation environment. In embodiments where the dominant impairment to be accommodated is frequency offset, then the mBTS or the terminals on the ground may be configured to adjust for this frequency offset, the Doppler spread not being as detrimental. Frequency offset may be adjusted for by adjusting monitoring frequencies, transmission frequencies, or both. The total amount of Doppler shift will be lower for terminals which are not directly underneath the path of the aircraft. This is because the motion of the aircraft is not directly towards or away from the ground terminal and this results in a reduced vector component of motion in the direction of the propagation path. Signals will be picked up later and lost sooner from such positions but at lower Doppler shift maxima.

In some embodiments one of the limitations to a terminal being able to detect a mBTS will be that it will search for a base station within a relatively narrow frequency range. If there is a potentially high frequency offset due to Doppler shift then the terminal may be configured to successively search similar widths of bands but with increasing offsets from the nominal frequency. The time taken to do this will add to the time taken to detect the base station and that may take too long for detection of a passing mBTS, especially because its frequency will also appear to change significantly as it passes.

In further embodiments, the terminal may successively search different non-overlapping frequency bands in a predetermined pattern. The pattern may be configured for example to reduce or minimize the expected time to find an mBTS given conditions such as expected mBTS transmit frequency, a schedule of expected mBTS locations or location ranges, and an expected mBTS speed or speed range. Each combination of transmit frequency, position (relative to the terminal) and speed may result in an expected observed frequency of signals transmitted by the mBTS. The terminal may thus be configured to search bands around mBTS transmit frequencies which are expected to be more likely to be observed, at certain times when they are expected to be more likely to occur. In some embodiments, the terminals may be configured to search certain frequency bands more often or more frequently if a higher probability of finding an mBTS signal is associated with those bands.

In some embodiments, a mobile terminal may be configured to anticipate first detecting an mBTS with a relatively high positive frequency offset as would be expected for an approaching mBTS. The positive frequency offset may be commensurate with an approaching mBTS with speed in a nominal range and at a distance within a nominal range. The frequency offset may be calculated using equation (1), wherein the relative speed v between mBTS and terminal can be calculated from the aircraft's absolute velocity and the relative positions of the mBTS and terminal, using standard trigonometric techniques.

However, it is preferable that mobile terminals should not have to operate differently from the way that they would normally be used in terrestrial networks and it is not to be expected that phones used for calling emergency services would have frequency offset listening capability. Therefore, in embodiments, it is preferable for the mBTS to deliberately offset the frequency of its transmitted signals in light of its known ground speed and height above the ground, in a manner which makes it appear as a stationary, or at least less quickly moving, base station from the perspective of the ground terminals that it is approaching. Once a terminal, such as a mobile handset or M2M terminal, on the ground has connected to the mBTS, the terminal should be able to track the varying frequency by adjusting itself to respond to the apparent mBTS frequency that it receives. Terminals known in the art possess the capability to adjust their frequency in response to a received frequency, for example in order that all terminals frequency clocks are slaved to the BTS master frequency clock to compensate for oscillator imperfections in terminals. As the mBTS approaches, passes overhead and recedes from the terminal, the frequency will appear to drop. If the mBTS anticipates the approaching Doppler shift as described above then it is important that mobile or M2M terminals do not also attempt to compensate for frequency offset when searching for initial contact with an approaching mBTS.

As noted above, mobile and M2M terminals adjust their own transmitter frequency to match the frequency that they receive from an mBTS. If the frequency that they receive is offset then they will offset their own transmission frequency to match. If there is no apparent offset then the terminals will transmit without an offset. If the offset is large then the frequency transmitted by the terminal will also be offset by the same amount. For example, if an mBTS, at a certain distance from the terminal, is approaching a terminal at a certain speed, there may be a +750 Hz offset in the signal received by the terminal. The terminal will then adjust its own transmission frequency by +750 Hz to match. As the mBTS also sees the terminal approaching it, the offset in the return signal received by the mBTS from the terminal will be about +1500 Hz relative to the original transmission frequency of the mBTS. Thus, the Doppler shift is applied once for each signal direction.

If, on the other hand the mBTS offsets its frequency down by 750 Hz before transmission to pre-empt an expected Doppler shift, a terminal ahead of and on the aircraft track will see a nominal offset of about 0 Hz and will accordingly not substantially adjust its own transmission frequency. However, the mBTS will still see the terminal responding with a 750 Hz positive frequency offset due to Doppler shift applied on the return path from terminal to mBTS. In this case, signals received by the mBTS are again offset by twice the relevant Doppler shift when compared to signals transmitted by the mBTS.

The above-described amounts of returning signal offset is more than a prior art tBTS would typically expect. In embodiments of the present technology, the mBTS receiver is configured to anticipate and/or accommodate Doppler-induced frequency shifts in signals received from terrestrial radio terminals. The mBTS receiver may be further configured to anticipate that a terrestrial radio terminal will adjust its own transmission frequency to match the mBTS transmission frequency, and may further be configured to predict the frequency of received signals based on this observation as well as factors such as the estimated speed relative to terminal and the mBTS transmission frequency. Accommodating Doppler-induced frequency shifts in the mBTS receiver may enable faster initial connection. In the case of initial acquisition of a signal coming from an approaching terminal, the amount of frequency offset can be expected to be within a range of positive offsets based on the known speed of the aircraft, in the same way that the offset used for transmission can be estimated. The mBTS may also have multiple simultaneous receiver processes, for example using digital signal processing, operating with different frequency offsets. The mBTS may then choose the output of the process that produces the most intelligible signal. That being the process that correctly anticipates the actual frequency offset. The amount of offset may not be as much depending on the relative position of the terminal to the ground track of the mBTS. Once connected, the terminal and mBTS may be able to track the changing Doppler shifts with the expected offsets.

If the distance of closest approach between mBTS and terminal is less than a predetermined threshold, the Doppler shift may change rapidly during close approach, which may be problematic for frequency tracking. However, since the mBTS is aboard an airliner which typically does not execute quick maneuvers, its path is generally predictable. Therefore, Doppler shift may be predicted in advance rather than tracked, or Doppler shift tracking may be facilitated by use of a parameterized model which takes into account the expected characteristics of the airliner's flight patterns.

In the above example, as the mBTS passes overhead of the terminal, the frequency of signals transmitted by the mBTS, as observed by the terminal, will drop. When the aircraft is directly overtop of the terminal, the observed mBTS transmitted frequency will temporarily be the same as the nominal (assumed to be 900 MHz) transmit frequency. As the aircraft recedes from the terminal at an assumed speed of 900 km/h, the observed mBTS transmitted frequency will be offset by −750 Hz. The total swing in frequency as observed by the terminal will thus be 1500 Hz. If the terminal adjusts its transmit frequency to match the received frequency, the total swing in frequency as observed by the mBTS may thus be approximately 3000 Hz. The mBTS may be configured to accept and accommodate the received signal frequency offsets, which may be up to about twice the difference between $f_r$ and $f_t$ as calculated by equation (1), higher order terms being neglected for simplicity. The above calculations assume, for simplicity, a zero distance of closest approach between aircraft and terminal.

As mentioned above, terminals on the ground will experience varying amounts of initial frequency offset depending on how far they are displaced to the sides of the track of the mBTS. In one embodiment an ideal Doppler compensating offset for the mBTS would be one that is not the highest value as seen by a terminal that is in line with the mBTS track but an offset lower than this that will allow easy detection by as many terminals as possible experiencing a range of offsets, in the widest possible path. In some embodiments, the mBTS is configured to generate one or more additional regions of offset frequency in regions defined by beam antennas.

Figure 8:
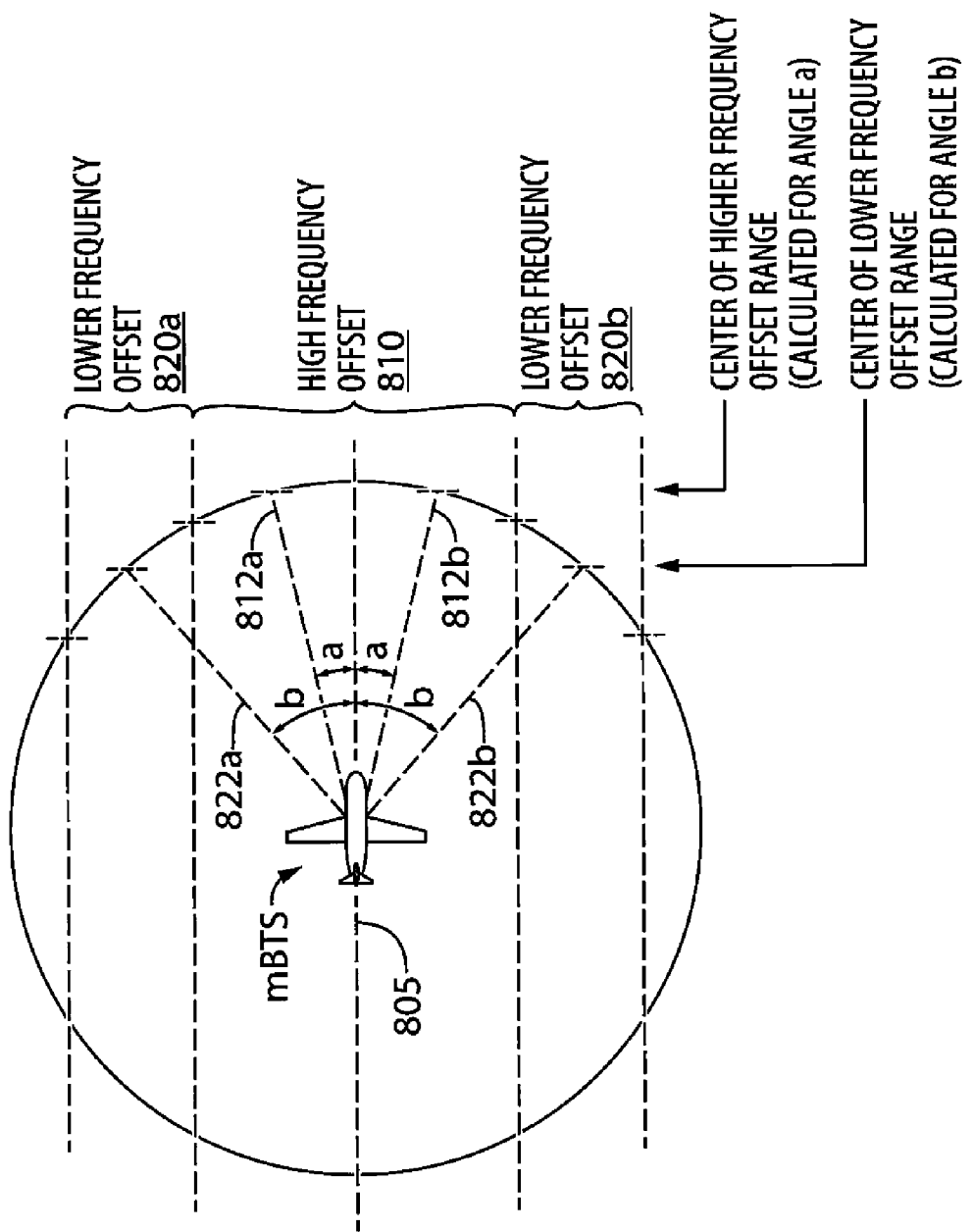
FIG. 8 illustrates an overhead view of an mBTS generating plural wireless signals directed toward plural ground regions, each wireless signal differently offset in frequency to compensate for the particular Doppler effects of its associated ground region, in accordance with an embodiment of the present technology.

FIG. 8 illustrates, via an overhead view, an embodiment in which a first region 810 is associated with a relatively high frequency offset and a pair of second regions 820a, 820b are associated with a relatively low frequency offset. The first region 810 lies on the ground substantially underneath the mBTS track 805 and having a predetermined width. The second regions 820a, 820b lie on the ground, adjacent to and possibly overlapping the first region 810, substantially parallel to the mBTS track and also having another predetermined width. To achieve this, a first radio signal, having the relatively high frequency offset to compensate for a relatively high Doppler shift, is transmitted via an antenna or antenna array which produces a pair of radio beams centered on lines 812a, 812b, respectively. A second radio signal, having the relatively lower frequency offset to compensate for a relatively lower Doppler shift, is transmitted via an antenna or an antenna array which produces a pair of radio beams centered on lines 822a, 822b, respectively. The frequency offset for both the first and second regions shifts the radio signal below its nominal frequency to pre-compensate for Doppler shifts in the opposite direction due to the mBTS approaching terrestrial terminals. Similar beams may be projected out behind the aircraft, with the frequency offset shifting the radio signal above its nominal frequency. A frequency offset may be achieved by adjusting the component frequencies of a signal to be transmitted by a predetermined amount, and then transmitting the adjusted component frequencies together, as would be readily understood by a worker skilled in the art.

Since the regions illustrated in FIG. 8 may overlap, terminals falling within two regions may see two versions of a signal with different offsets. This would potentially be problematic to communication within the regions of overlap. In some embodiments, a separate mBTS on a different channel is used for each region, thereby alleviating this problem at the expense of more complication and cost. This solution would enable terminals across the full range of the width of coverage across the aircraft track to make a connection quickly. It would still require the terminals to have the capability to track the lowering Doppler frequency offset as they pass under the mBTS.

Figure 9A:
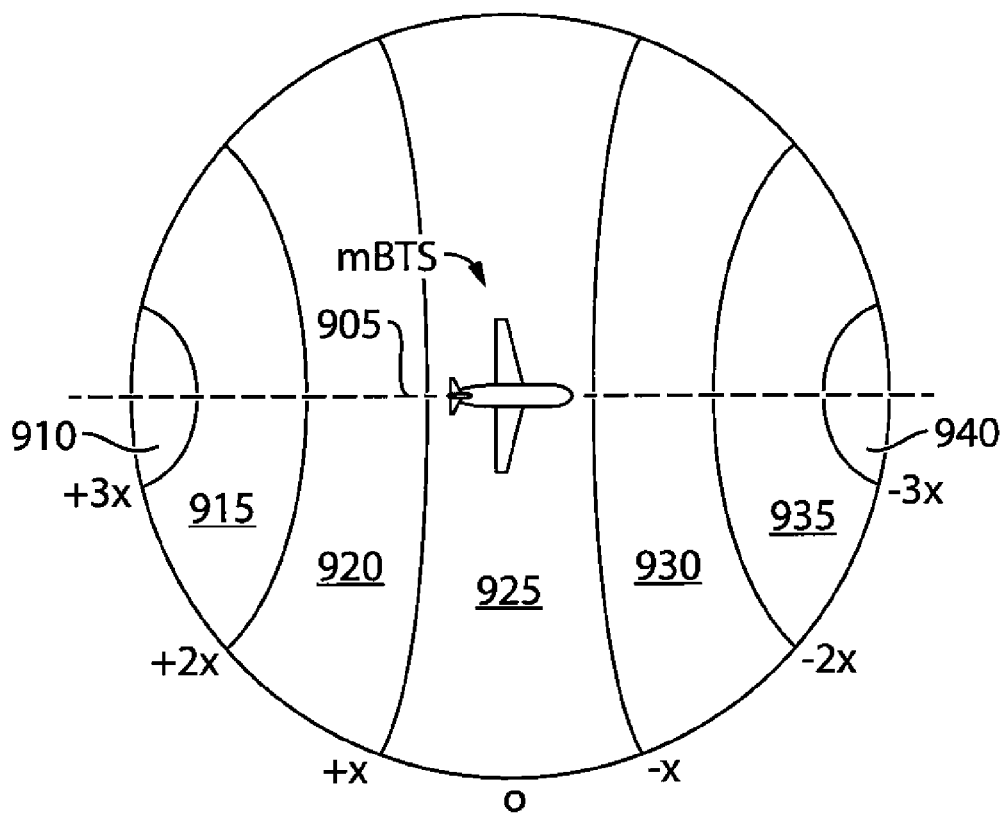
FIG. 9a illustrates an overhead view of an mBTS generating plural wireless signals directed toward plural ground regions, each wireless signal differently offset in frequency to compensate for the particular Doppler effects of its associated ground region, in accordance with another embodiment of the present technology.

An alternative option, in some embodiments, is to have multiple antenna beams in stripes across the mBTS track 905, with hyperbolic shapes as shown in FIG. 9a, which illustrates an overhead view of an mBTS and ground regions 910, 915, 920, 925, 930, 935 and 940, each ground region corresponding to a different antenna beam. Each antenna beam may correspond to a separately frequency shifted version of the mBTS transmitted signals, with frequencies offset to cover the areas simultaneously experiencing similar but opposite frequency offsets due to Doppler shift. As shown in FIG. 9a, the ground regions 910, 915, 920, 925, 930, 935 and 940 would appear on the ground in stripes nominally perpendicular to the mBTS track 905, with boundaries diverging in the shapes of hyperbolas. Each ground region may correspond with an antenna beam or multiple antenna beams which are directed toward said ground region from the mBTS. For example, an antenna beam may be directed vertically from the mBTS as well as to the sides of the mBTS to correspond to the ground region 925. Ground regions further away from the mBTS may correspond to antenna beams with less vertical declination than ground regions closer to the mBTS. The antenna beams may be configured so as to intersect with the ground in a manner which results in the stripes as illustrated, or an approximation thereof, for example using suitable antennas or beamforming arrays. In some embodiments, the antenna beams may be adjusted in response to terrain features, mBTS height, and the like. Alternatively, each line illustrating a boundary between regions may denote lines of maximum signal strength or beam center lines for a given region.

Figure 9B:
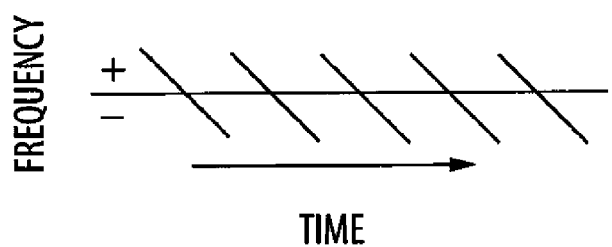
FIG. 9b illustrates a plot of observed frequency over time for a terrestrial radio terminal receiving signals from an mBTS of FIG. 9a, in accordance with an embodiment of the present technology.

As illustrated in FIG. 9b, a ground based terminal, at a predetermined location and with an mBTS passing nearby as illustrated in FIG. 9a, would perceive a substantially sawtooth profile of frequency variation centered at the nominal frequency. As the terminal moved through each region, for example first through region 940 followed by region 935, the frequency of signals received by the terminal from the mBTS would appear to increase due to Doppler effects. As the terminal crossed from one region into another, the frequency would jump, since the terminal would now be exposed to a different signal, having a different frequency offset. The sharpest frequency variation would be seen at the transition between beams or regions because there would appear to be two different maximally offset frequencies at the overlap. Once within a single beam the frequency would drop steadily until the next beam. Thus, the range of frequency variation is limited since the signal received by the terminal appears to be periodically re-compensated for different degrees of Doppler shift.

More separate beams could be used to make the range of frequency variation smaller. Another possibility would be to use a separate mBTS for each beam. This would require additional complexity and the short transit time through each stripe may not be practical because of a need for quick initial detection by the leading mBTS and handoffs from one mBTS to the next as the aircraft passed overhead the terminals. Although handoffs can be achieved in a fraction of a second for the LTE protocol this is nevertheless a relatively complicated option. As the mBTS may be able to predict its location well in advance based on flight path information, handoff events may be anticipated well in advance, which may aid in further speeding up the handoff process.

Figure 10:
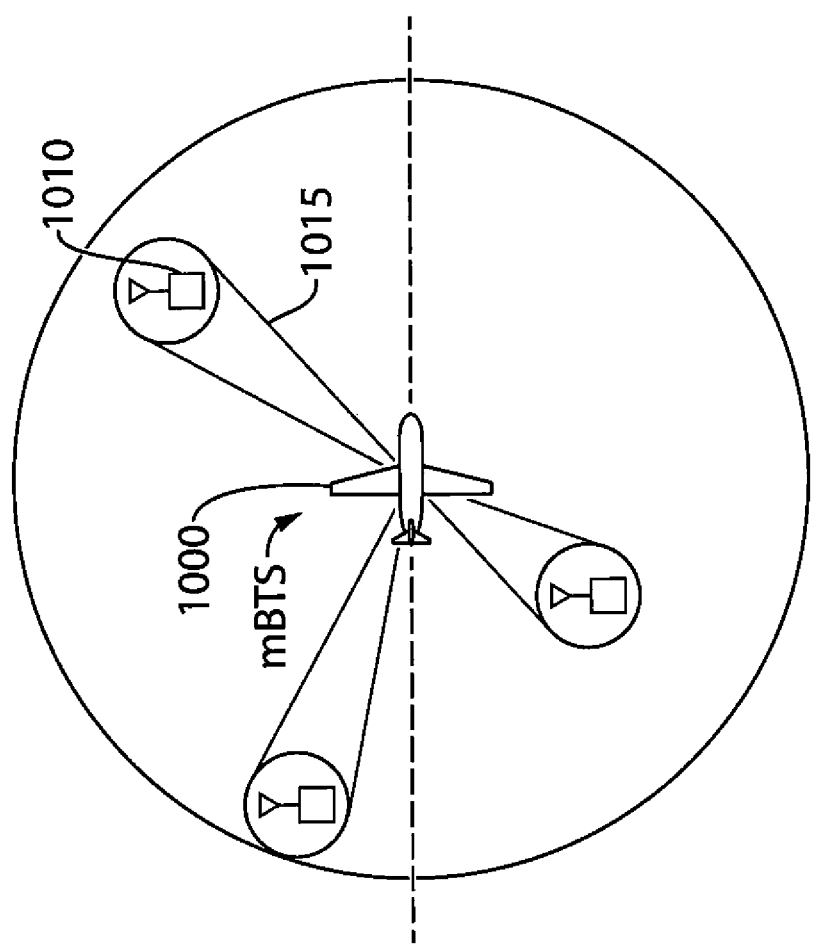
FIG. 10 illustrates an overhead view of an mBTS directing wireless signals at targeted terminals on the ground, each wireless signal differently offset in frequency to compensate for the particular Doppler effects of its associated targeted terminal, in accordance with an embodiment of the present technology.

In some embodiments, multiple directional steerable antennas or a beamforming antenna array may be used to direct beams at individual terminals on the ground, as shown in FIG. 10. For example, beam 1015 is directed at terrestrial terminal 1010 from the mBTS 1000. In a further embodiment, there is provided a separate mBTS for each terminal or cluster of terminals near the aircraft, each mBTS working to manage, for example to reduce or minimise, the offset of frequency dynamically for its associated terminals. Practical limits on the number of available mBTSs and frequencies would limit the number of terminals that could be served this way. There would also need to be a way to acquire a terminal upon first falling within the coverage of the aircraft. This might require at least one or more leading mBTS configured as one or more of the leading mBTS stations in FIG. 8. This could be achieved using a separate antenna or a beamforming phasing arrangement of an antenna array. There may be various combinations of the above techniques that could be used to accommodate simultaneously communicating with two or more terminals seeing different Doppler-induced frequency shifts. Providing multiple mBTSs on an aircraft would be more expensive and may not be a good use of the available frequencies especially in wide band schemes such as LTE that operate in blocks from 1 MHz to 20 MHz. Multiple steered beam antennas or phased array beams, one pointed to each ground terminal or cluster of ground terminals, are possible but would require surface area of the aircraft. A flexible beamforming phased antenna array could be adhered to the outside of the aircraft. Antennas with parabolic reflectors may be physically pointed in desired directions. Various solutions may be employed subject to size, weight and aerodynamic drag limitations. Tracking of individual target terminals on the ground by the antenna array on the aircraft could be done using techniques known in the art. For example, U.S. Pat. No. 5,515,378 describes methods that can be used by base stations to direct beams to multiple vehicles.

In some embodiments, the beams may be arranged to have individual frequency offsets for transmitting in order to compensate for the relative motions of each terminal relative to the mBTS. Information obtained from tracking relative position and speed of the individual terminals or clusters may be used to adjust the amount of frequency offset applied to individual beams in compensation of Doppler effects.

In order to offer the implementation of the mBTS in a simple and low cost manner, the example of operating a single mBTS will now be detailed. In addition, the need to only communicate within the limitations of Doppler shift as defined for normal terrestrial operation will be used as a constraint. It is also constrained that the mBTS will operate as a terrestrial BTS would, without applying compensating Doppler shifts to its transmitted signals. The following example illustrates in detail how these scenarios could limit the coverage area of a passing mBTS as experienced by terminals on the ground.

Figure 2D:
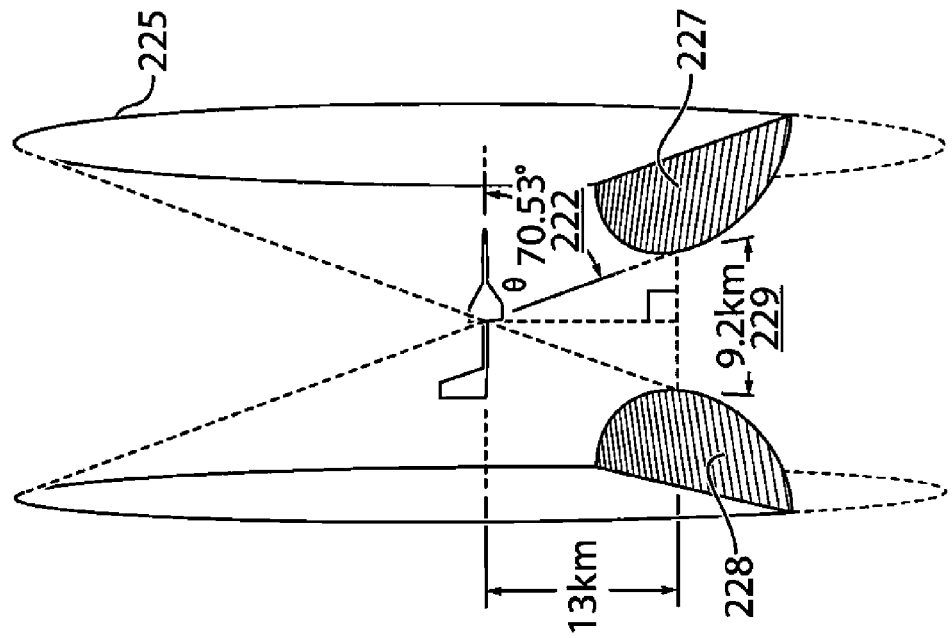
FIGS. 2b-2f illustrate a derivation of regions from which it is feasible to communicate with an mBTS, due to Doppler frequency shift considerations, in accordance with an example scenario of the present technology.
Figure 2B:
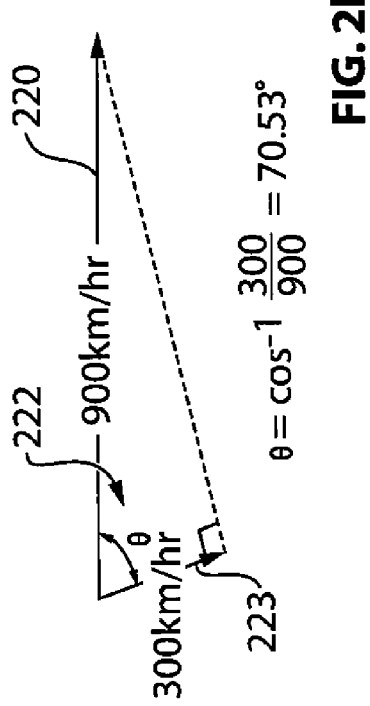
Figure 2C:
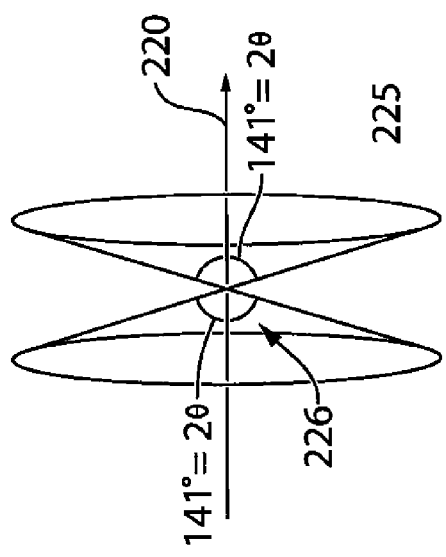

For example, if it is assumed that for a particular communication protocol, the maximum Doppler frequency shift allowable is equivalent to motion at 300 km/h, but the aircraft is moving at 900 km/h, this defines cone shaped areas in front of and behind the track of the mBTS with an apex angle of 141 degrees within which communication is not possible (an instance of a Doppler-inhibited region as referred to herein). FIGS. 2b and 2c illustrate a sample derivation for such a cone. In the present example, the mBTS proceeds along the direction of the line 220 at a velocity of 900 km/h. For a terminal falling along the line 220, the relative velocity between mBTS and terminal (the rate of change of distance therebetween) is 900 km/h. For terminals located on another line 223 projecting above, below and/or to the side of the line 220, the relative velocity decreases as the acute angle between the line 220 and the line 223 increases. The line 223 also passes through both the mBTS and the terminal. At a critical angle θ 222 between the lines 220 and 223, the relative velocity reaches 300 km/h (the nominally maximum acceptable velocity as described above). The cone 225 encompasses all lines 223 which form an angle with the line 220 which is less than or equal to the critical angle θ 222. Therefore, terminals falling within the cone 225 are currently experiencing a relative velocity with the mBTS of over 300 km/h and hence communication between such terminals and the mBTS is infeasible due to Doppler shift. The internal angle 226 of the cone is 2θ or about 141 degrees. The cone 225 also includes fore and aft lobes, as the relative velocity between the terminal and the mBTS may be positive or negative (as the mBTS may be approaching or moving away from the terminal at a speed greater than 300 km/h.)

Such wide cones may intersect with flat ground from an altitude of 13,000 m to produce first and second areas on the ground, fore and aft of the mBTS, each with hyperbolic boundaries. FIG. 2*d* illustrates this intersection of cone 225 and ground, the intersection being manifest by two hyperbolic areas 227 and 228 fore and aft of the aircraft (i.e. areas bounded by the illustrated hyperbolas). As the ground varies from flat, these boundaries deviate from the illustrated hyperbolic areas. The minimum distance 229 between the first and second areas in this instance is about 9.2 km. Thus, communication between the mBTS and a ground terminal situated along the track of the mBTS is feasible for only about 36.8 seconds, which is the time that the ground terminal is situated within the Doppler-feasible region, in this case along the 9.2 km track between hyperbola vertices. Coverage that meets the Doppler limit will be longer for terminals placed either side of the mBTS track.

Figure 2E:
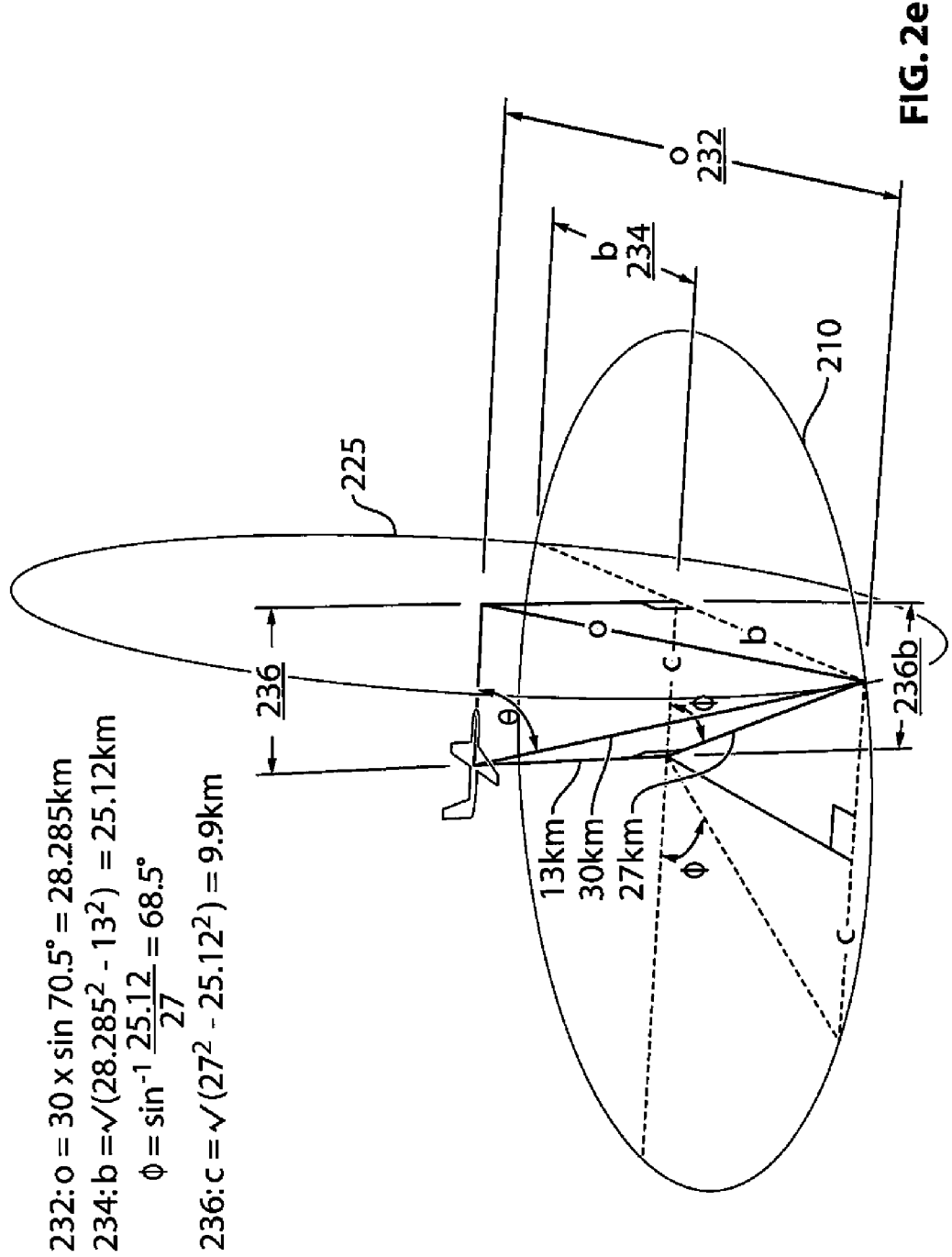

FIG. 2*e* illustrates some sample dimensions related to the circle 210 and the cone 225. In particular, the radius o 232 of the cone at the point where the boundary of the hyperbolic area 227 intersects the circle 210 is about 28.285 km; the half-width b 234 of the hyperbolic area 227 at this point of intersection is about 25.12 km; and the distance c 236 from the mBTS to the portion of the cone having the radius 232 is about 9.9 km. The distance 236*b* is the same as the distance 236 but is measured along the ground rather than in the air.

Figure 2F:
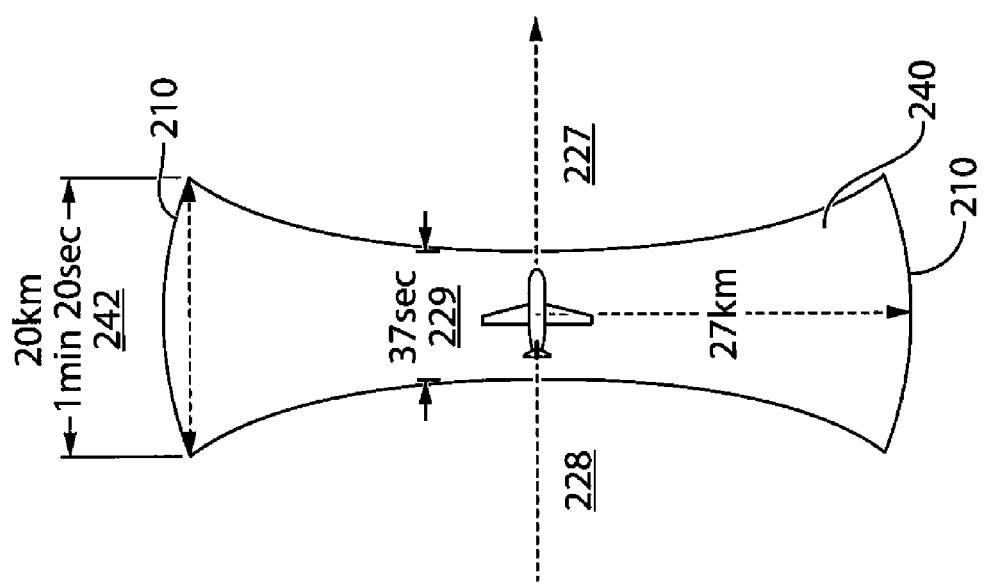

At the limits of coverage, the longest path will be about 1 minute and 20 seconds, the time taken for the aircraft to travel about 20 km. FIG. 2*f* illustrates this longest path 242. If a nominal 45 seconds is needed to make an initial connection then the combined effect of all of the limitations noted above suggests that the best probability of connection and useful communication with terrestrial wireless terminals is limited to the ground region 240 illustrated in FIG. 2*f*. The ground region 240 is defined by removing the two hyperbolic areas 227 and 228 from the circle 210. The useful part of this ground region, 240 will be reduced further by the amount of time terminals entering it take to establish a connection to the mBTS. At the narrowest region it is possible that a terminal may not connect with the mBTS before the terminal is no longer within the coverage area.

Once communication has been established, it should, in some embodiments, be expected that the Doppler shift will decrease as the mBTS approaches a plane perpendicular to the mBTS path and intersecting the terminal. If a mBTS passed very close to a terminal the Doppler shift would decrease more rapidly at the point of closest pass. In the theoretical limiting case, where the minimum distance achieved between mBTS and terminal is zero, the offset frequency would switch from the maximum positive frequency offset to the maximum negative frequency offset at the instant of intersection, according to a step function. The acoustic analog of this effect can be appreciated by listening when a vehicle on the street passes a stationary listener. In some embodiments, the mBTS and/or terrestrial wireless device receivers can be made to track a changing frequency offset but there may be a practical limit to how fast a rate of change can be tracked before a receiver loses lock to a signal. There will be a region, relative to the mBTS track, in which terminals would experience an unacceptably high rate of change of Doppler shift. In some embodiments, this region corresponds to the 360 degree rotation of a teardrop shape, with its pointed tip at the mBTS, about an axis on the mBTS track. This region would not typically reach down to the ground from 13,000 m height. In practice therefore, for a terminal communicating with a mBTS at altitude, there will only be a relatively steady change of Doppler shift that should not result in communication difficulty. FIG. 3*a* illustrates the received center frequencies over time, due to Doppler shift, for three terrestrial wireless terminals, each located at a different distance from the mBTS as it passes by, for example directly overhead. The mBTS transmits at a center frequency $f_o$. The received frequency 310 at a first terminal decreases relatively slowly as the mBTS passes overhead. The received frequency 320 at a second terminal, closer to the mBTS than the first terminal, decreases relatively more quickly. The received frequency 330 at a third terminal, which is substantially adjacent to the mBTS as it passes overhead, decreases substantially instantaneously. The frequency change at the first terminal may be more easily tracked than those at the second and third terminals, since it changes more slowly.

In one embodiment, since the Doppler shift while the mBTS is approaching a terminal is substantially equal in magnitude but opposite in sign to the Doppler shift while the mBTS is receding from the terminal after flyover, the mBTS and/or terminal may be configured to measure the Doppler shift during approach, and use this estimate for frequency compensation during recession.

FIGS. 3*b* and 3*c* illustrate a toroidal shaped region 340 with a teardrop shaped cross section, as mentioned above, within which the Doppler shift changes at a rate which is beyond tracking. FIG. 3*b* illustrates the region 340 in cross section while FIG. 3*c* illustrates a perspective view. FIG. 3*c* further illustrates the intersection 345 of the region 340 with the ground, which may occur for some low altitude flyovers.

In summary, for some embodiments, the time interval for which a terrestrial radio terminal and an mBTS are capable of communication is the time interval for which the terminal and mBTS are within communication range (for example when the terminal is in a spherical region centered on the mBTS), and the terminal is outside of the cone-shaped Doppler-inhibited region centered on the mBTS. A substantially equivalent set of conditions could be derived using the terminal, rather than the mBTS as the center of interest. At a given instant, the region of space lying within the sphere and outside the cone may be referred to as the Doppler-feasible region. As illustrated in FIG. 2*f*, the intersection of the Doppler-feasible region with a flat ground surface generally results in an area 240 which is generally circular in shape but with two hyperbolic areas removed. The distance 214 across the area 240 perpendicular to the direction of motion of the mBTS is about 54 km, as described above. Directly below the mBTS, the two hyperbolic boundaries are separated by a distance 229 of about 9.2 km. The largest distance 242 across the area 240 in the direction of motion of the mBTS can be determined to be about 20 km, or twice the measurement 236 illustrated in FIG. 2*e*.

Therefore, in embodiments of the present technology, the mBTS is configured to concentrate communication resources toward a set of feasible terrestrial radio devices. Membership in this set is based at least in part on the induced Doppler shift being below a predetermined shift threshold. Membership in this set may also be defined at least in part on an expected time interval, when the device is in range and the induced Doppler shift is below the shift threshold, being greater than a predetermined time threshold. For example, the time threshold may be a minimum amount of time required for a terminal to reliably discover an mBTS and/or vice-versa, establish a communication link, and transfer a predetermined amount of data. In one embodiment, the time threshold is about 45 seconds. In a further embodiment, an antenna or antenna array of the mBTS is configured to have a radiation pattern which is focused toward one or more regions encompassing the set of feasible terrestrial radio devices. In another further embodiment, the mBTS is configured to determine an expected membership time for each of one or more members of the set of feasible terrestrial radio devices and to prioritize communication based at least in part on said membership time. The mBTS may be configured based on an observed Doppler shift or aircraft ground speed indicative thereof, or based on a nominal Doppler shift or aircraft ground speed.

In one embodiment, prioritizing communication with a terrestrial radio device comprises frequency adjustment signals transmitted by the mBTS to frequencies which are expected to be scanned sooner by the terrestrial radio device. The intent is to allow the terrestrial radio device to discover an as-yet undiscovered mBTS sooner, and in time to establish a connection an transfer data before falling outside of the feasible set.

In embodiments of the present technology, the mBTS is configured to adjust its operation to avoid interfering with terrestrial portions of the cellular communication network during flyover. For example, the mBTS, when proximate to a tBTS, may turn off or adjust its operating frequency or range so that it does not interfere with the tBTS and/or it does not cause terrestrial radio devices to connect to the mBTS unnecessarily if they could be serviced by a tBTS instead. Furthermore, in embodiments of the present technology, two mBTS stations mounted on two proximate aircraft may be configured to coordinate with each other, for example for non-interference.

Various embodiments of the present technology may relate to a method for operating an aircraft-mounted mBTS, as described herein. For example, a method may be provided by which an mBTS transceiver utilizes stored information to adjust its transceiver power levels, antenna or antenna array radiation pattern, communication frequencies, channels, select a radio access technology, or the like. The method may comprise obtaining information and adjusting the mBTS operation based on the information, in order to coexist with other mBTSs and/or tBTSs. Information may be location information, time information, information obtained from monitoring the radio environment, information obtained from various sensors such as Radar, information stored in a local or remote database, or the like, or a combination thereof. The method may comprise adjusting mBTS operation based on a schedule, either internally derived or obtained from an mBTS coordination system or via a related method.

The above method may additionally or alternatively comprise adjusting transceiver operation in light of Doppler shifts. For example, the method may comprise adjusting antenna or antenna array radiation patterns to focus communication toward Doppler-feasible regions. The method may additionally or alternatively comprise scheduling and/or prioritizing communication with terrestrial radio devices based on information such as expected membership time within a Doppler-feasible region. The method may additionally or alternatively comprise compensating for Doppler-induced frequency shifts by adjusting the frequency of operation of the terrestrial radio devices and/or the mBTS to track such frequency shifts.

Another example method may relate to store and forward communication operation, as described herein. For example, the method may comprise receiving communication from a particular terrestrial radio device, storing the communication, optionally acknowledging receipt of the communication, and later forwarding the communication to a recipient specified by the terrestrial radio device. Forwarding may be upon landing of the airliner, or upon passing a relay such as another mBTS, tBTS, backhaul station, or another terrestrial radio device on the anticipated flight path of another mBTS. A method may additionally or alternatively comprise storing a communication aboard the mBTS until flyover of an intended recipient terrestrial radio device, and transmitting the communication at or around the expected time of flyover and/or at or around the expected flyover location.

Apparatus

FIG. 1 illustrates a mBTS mounted aboard an aircraft 110 in accordance with embodiments of the present technology. The mBTS comprises a transceiver module 120 operatively coupled to one or more antennas. For example, the transceiver module 120 may be coupled to an antenna 130 mounted on the underside of the aircraft fuselage. As another example, the transceiver module 120 may be coupled to an array of two antennas 132, 134 mounted on the underside of opposite wings. In some embodiments, the antenna 130 or the antennas 132, 134 may comprise one or more beamforming antenna arrays. Other antenna mounting points may also be used. The transceiver module 120 is functionally similar to the corresponding components (except the separately illustrated antenna) of a terrestrial base transceiver station of the appropriate type, for example GSM, node B, eNB, or the like. For example, the transceiver module 120 may comprise components such as a driver receiver, optional combiner, power amplifier, duplexer, and various control functions as would be known to a skilled worker. Construction and configuration of an appropriately lightweight and compact transceiver for a given cellular communication technology would further be readily understood by a worker skilled in the art.

In some embodiments, an array of antennas, such as antenna 132, 134, may be useful in locating terrestrial radio devices relative to the mBTS. For example, localization techniques using TDOA and AOA may be used. Measurement of the rate of change of Doppler shift may also be used in locating terrestrial radio devices. Localization techniques may be used for determining the position of emergency callers. Locations of terrestrial devices may be used for prioritizing, anticipating, and/or scheduling of communications. In some embodiments, the mBTS may be configured to scan for and/or localize terrestrial radio devices in the Doppler-inhibited region by compensating for Doppler-induced frequency shifts expected to occur in signals originating from that region. The presence of signals in the Doppler-inhibited region may be detected even if the signal content itself is not reliably decoded. For example, a reference signal transmitted from a wireless terminal and received by the mBTS may be associated with a characteristic Doppler-induced distortion, depending on the relative location of the wireless terminal and the relative speed between mBTS and terminal. By identifying the characteristic distortion, the approximate location of the wireless terminal may be deduced.

In some embodiments, since wireless terminals in front of the mBTS will exhibit a positive frequency shift, while wireless terminals behind the mBTS will exhibit a negative frequency shift, the mBTS may be configured to monitor for those Doppler-induced distortions associated with positive frequency shifts, since this will aid in anticipating upcoming encounters with wireless terminals, rather than focusing on receding wireless terminals, which are less likely to remain within range for an adequate period of time.

The mBTS further comprises a backhaul module 140. The backhaul module 140 is configured to connect the transceiver module 120 with the greater infrastructure of the cellular communication network, for example a Base Station Controller, or with other network components, ultimately with the purpose of linking the terrestrial radio devices with other telephones, servers, radio devices, and the like.

The backhaul module 140 comprises a communication link module 142, which comprises a transceiver configured to communicate with the greater infrastructure of the cellular communication network. For example, the communication link module 142 may comprise a microwave transceiver configured to communicate with one or more ground-based relay stations, satellites, aircraft-mounted relay stations, tBTS, or the like. In some embodiments, the communication link module 142 may maintain a substantially continuous communication link. In some embodiments, the communication link module 142 may maintain an intermittent communication link. For example the link may be made when practicable, or when the aircraft is over a city or at an airport. The communication link maintained by the communication link module 142 is generally wireless. However, in one embodiment, the communication link is a wired communication link which is established when the aircraft is on the ground, for example docked at an airport gate. This embodiment can generally be used in conjunction with store-and-forward communication.

In some embodiments, backhaul communications via the communication link module 142 may be facilitated using base stations placed at 200 mile intervals, as is currently done for the Airfone™ service, and/or by use of satellite-based relay stations. Alternatively an aviation communications channel may be used to support backhaul communications, if feasible, for example at a lower priority than other aviation-related communications.

In some embodiments, the backhaul module 140 comprises a store and forward module 144. The store and forward module 144 is configured to store communications received from terrestrial radio devices for future forwarding via the communication link module 142. Additionally or alternatively, the store and forward module 144 is configured to store communications received via the communication link module 142 for future forwarding to terrestrial radio devices via the transceiver 120. The store and forward module may be configured to forward messages opportunistically, for example when an appropriate communication link is available or a terrestrial radio device connects to the mBTS. Means such as email, SMS, MMS, TCP/IP, recorded voice or simulated voice messages, or the like, may be used to communicate store-and-forward messages. Those means supported by the mBTS and underlying communication protocol (for example GSM, UMTS, CDMA, LTE and the like).

In embodiments wherein backhaul communications operates via a store and forward operating model, the mBTS may collect messages targeted for devices in the area the mBTS is likely to be in, prior to departure, possibly from the existing terrestrial cellular network while at an airport. The knowledge of the area to be covered can be provided in an automated way based on the flight number or flight plan. The mBTS may then attempt to connect with the intended recipients at appropriate times, or at several times to increase the chances of message receipt, and transmit the messages once connected. The mBTS may store messages received during flight, such as text or data messages. Upon landing, the mBTS may be configured to forward of the messages into the greater communication network connected thereto. The mBTS may thus be configured so as to be able to act as a message originating and terminating server for this purpose.

In one embodiment, the airborne mBTS may be configured to conduct a dialogue with terrestrial radio devices, such as M2M devices, and with the network so that terrestrial devices and the network fully co-ordinate their understanding of which messages have been received, if it is desired to acknowledge receipt to the senders.

In one embodiment, a store-and-forward phone service may be provided, in which the mBTS is configured to record a message such as a voice message, and forward the message upon landing. The mBTS may comprise a recording module for this purpose. The recording module may also be configured to store messages before takeoff and forward these messages at an appropriate time, for receipt by a remote, terrestrial radio device.

In one embodiment, the recording module may be configured to present itself to the mBTS as a conventional telephone which responds to incoming voice calls directed to any number. The mBTS will thus connect incoming voice calls to the recording module, which then records the call, for example in line with a typical answering machine. The recording module also records the phone number which it is currently representing in proxy. The recording module is further configured to detect when the mBTS is later connected to a wider network, and initiate a call to the recorded phone number. When the call is answered, the recording module is configured to play back the message. Alternatively, the recording module may upload all recorded messages to another device, which makes the required calls and plays back the messages.

In one embodiment, if an emergency or 911 call is answered by the mBTS, the mBTS and/or recording module may be configured to answer, advise that an automated receiver in a passing aircraft is the recipient and ask the caller for details to forward. In this case use of the aircraft's radio link to air traffic control, or another aircraft air to ground frequency may be used to forward the message quickly. The mBTS may also include where it was when the message was received and a caller ID for verification and possible follow up of nuisance calls. The mBTS may also be configured to receive and forward GPS information provided by the caller's phone.

In embodiments of the present technology, the mBTS further comprises a controller module 150. The controller module 150 may be configured to control the transceiver 120 and/or backhaul module 140 in a variety of ways, for example to facilitate BTS coexistence, transceiver adjustment for Doppler considerations, scheduling and prioritizing of communications with terrestrial radio devices, for example in light of Doppler considerations and/or expected time until connection and/or connection loss, and the like. BTS coexistence may be facilitated by turning off or reducing power to the transceiver power amplifier when proximate to a tBTS or another mBTS, frequency adjustment when proximate to a tBTS or another mBTS, or the like.

In some embodiments, the transceiver 120 may further be capable of facilitating communication between two terrestrial radio devices concurrently connected thereto. In this case, the transceiver can act to relay communications, without necessarily requiring the backhaul module 140. Alternatively, these communications may be routed through the backhaul module 140, which may simply serve as a convenient channel.

In some embodiments, the apparatus may act as a store-and-forward system for communicating a message from a first terrestrial radio module to a second terrestrial radio module, wherein the second terrestrial radio module is in communication with the mBTS some time after the first terrestrial radio module falls out of communication with the mBTS.

As mentioned above, embodiments of the present technology provide transient flyover connectivity to one or more remote terrestrial radio devices, such as machine-type (machine-to-machine or M2M) devices. Machine-type devices may include smart meters, wireless sensor/actuators, data collection terminals, wildlife trackers, and the like. Other remote terrestrial radio devices may be cellular phones or other cellular-enabled devices carried by hikers, campers, travelers in remote regions, rangers, or the like. Repeated aerial flyovers by the same mBTS or by different mBTS may thus provide intermittent connectivity to, from, and/or between such devices. In one embodiment, if a remote person does not check in periodically via the present technology, an alert condition is triggered.

Although transient or intermittent connectivity provides less than continuous service availability, it can be more economically viable in remote regions as it does not require a permanent or semi-permanent base station presence. It can provide an assurance of at least some emergency communication coverage, for example in case a person is lost or injured in a remote region. It can also provide an adequate communication channel when communications are delay tolerant.

As also mentioned above, transient connectivity may comprise live connectivity or store-and-forward connectivity, wherein store-and-forward connectivity can be considered to be adequate for delay-tolerant communications. Since there is typically a pendency period between message readiness and mBTS flyover, accruing an additional delay while the message is stored by the mBTS is likely not to be considered critical in at least some instances.

Transient connectivity allows aircraft flight paths to be optimized for considerations other than cellular coverage time. For example, flight paths may be optimized for fuel consumption, flight time, passenger service, and the like. Considerations such as providing timely cellular service by the mBTS and/or providing service in a predetermined area may be factored into planning the flight path to a limited degree, or not at all. Embodiments of the present technology may thus generally provide opportunistic connectivity only. This is generally desirable since the added expense of rerouting or rescheduling an airliner simply to provide cellular service to a few customers in remote areas is expected to be uneconomical in many cases, unless in a case for example where the reroute or reschedule is minor.

As mentioned above, embodiments of the present technology provide for operation of the mobile base transceiver station to be adjusted in light of a Doppler shift. The Doppler shift is a consequence of motion of the aircraft relative to the terrestrial radio devices.

At a given instant, a region of space around the mBTS carried aboard a moving aircraft, may be divided into a Doppler-inhibited region and a Doppler-feasible region. The region of space itself is limited by the mBTS radio range, and obstacles such as the ground. Communication with terrestrial radio devices falling within the Doppler-inhibited region are likely not possible due to the magnitude of the frequency shift, whereas communication with terrestrial radio devices falling within the Doppler-feasible region are likely possible. The Doppler-inhibited region may be substantially cone-shaped, centered on the aircraft, such that the main axis of the cone-shaped region is parallel to the aircraft's current direction of motion. For a multi-antenna mBTS, the Doppler-inhibited region may vary somewhat but still typically resembles the above noted cone-shaped region on a sufficiently large scale. The angle spanned by the cone generally increases with the ground speed of the aircraft. The Doppler-feasible region coincides with the region of space which does not fall within the Doppler-inhibited region. The aforementioned region of space, Doppler-feasible region, and Doppler-inhibited region move with the aircraft and thus with the mBTS.

As will be readily understood, communications between a mBTS and a terrestrial radio device occur over a predetermined, non-instantaneous time interval. A call needs to be set up, data exchanged in both directions, and the call terminated. In cellular communication systems, a terrestrial radio device needs to discover the mBTS and coordinate with the wireless environment before communication can occur. The overhead time required, among other things, to connect, set up a call or data exchange, and execute the call or data exchange, varies with communication technologies and would be readily understood to a worker skilled in the art for a given technology. In an example embodiment, verified by simulation, acquiring a connection after introduction of the mBTS requires about 45 seconds. Once connected, the transfer of small amounts of data may take less than a second. For a voice call, the call time available may be less than some users might expect. Therefore, in some embodiments, an automatic message may be conveyed to the user that the call time is limited.

Therefore, in embodiments of the present technology, adjustment of mBTS operation is based on the Doppler shift, taking into account the amount of time required to execute a call or data exchange with a terrestrial radio device. For example, the mBTS may be configured to predict an expected amount of time that a terrestrial radio device will be inside the Doppler-feasible region, and to accept, reject, schedule, and/or prioritize communications with the terrestrial radio device accordingly.

In embodiments of the present technology, a sequence or continuum of subsequent Doppler-inhibited regions, each corresponding to a different time, can be used to define a Doppler-inhibited super-region, which is also a function of a nominal time interval. More specifically, the Doppler-inhibited super-region defines a volume of space, along the flight path of the aircraft carrying the mBTS, such that substantially stationary terrestrial radio devices in the super-region fall within the Doppler-feasible region for less time than the nominal time interval. Thus, sufficient communication with radio devices in the Doppler-inhibited super-region is not feasible. The Doppler-inhibited super-region does not move with the mBTS, but is rather defined in part by movement of the mBTS.

Figure 4:
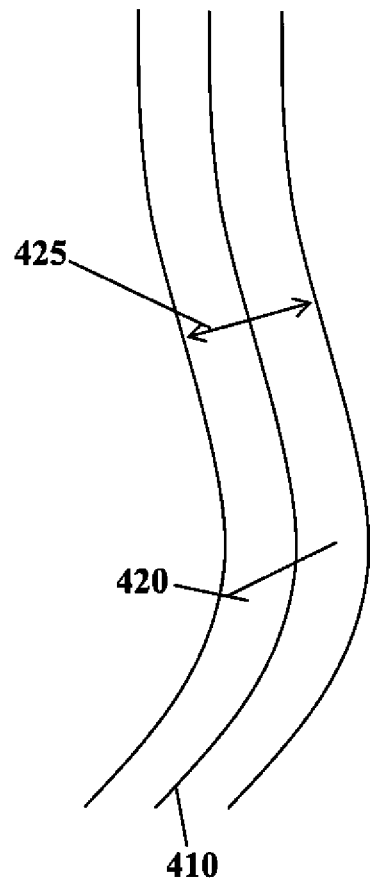
FIG. 4 illustrates Doppler-related inhibition of communications underneath the host aircraft flight path of a mobile Base Transceiver Station, in accordance with an embodiment of the present technology.

For example, as illustrated in FIG. 4, when the aircraft flight path 410 is relatively straight, and the aircraft speed and altitude above ground are substantially constant, the Doppler-inhibited super-region may comprise a band 420 of terrain below the flight path 410. The illustrated band 420 is actually the intersection of the ground with a region of space underneath the flight path where the cones intersect with the ground surface. In some embodiments, the width 425 of the band 420 is a function of one or more of the mBTS height above ground, the nominal time interval and/or the ground speed of the aircraft.

In some embodiments, adjustment of the mBTS operation comprises servicing terrestrial radio devices which are at least a predetermined distance from the mBTS. This is based on the observation that nearby radio devices will likely not be within the Doppler-feasible region for a sufficient amount of time, and thus communication resources should not be wasted on such terminals. A potential factor for consideration is that the angle between the mBTS and a nearby terrestrial radio device may change rapidly during flyover, which may further impede communication even within the Doppler-feasible region. In one embodiment, the locations of terrestrial radio devices is known a priori, for example as logged in a database, and prioritization is performed based on database-derived locations.

In embodiments of the present technology, adjustment of the mBTS operation comprises configuration of the antenna radiation pattern thereof. The antenna radiation pattern may be a substantially static characteristic of the antenna, due to its design. In this case, the antenna may be designed so that its radiation pattern is focused toward the Doppler-feasible region. That is, the antenna is configured to have a gain which is larger outward from the sides of the aircraft than it is outward from the fore and aft of the aircraft. In some embodiments, the antenna radiation pattern may be adjustable, for example when the antenna comprises a phased array of antennas. In this case, the radiation pattern may be fixed or it may be adjusted to more closely focus toward at least a part of the Doppler-feasible region, potentially as this region changes due to changing aircraft speed or the like.

In some embodiments, the mBTS comprises an antenna pointing down from the belly of the aircraft. The antenna is preconfigured to concentrate the transmitted signal and the receive sensitivity in the pattern that matches the technically practical coverage, that is corresponding to the Doppler-feasible region and/or super-region. In one embodiment, the antenna is a dipole antenna along the axis of the fuselage, possibly housed in a small fin for low aerodynamic drag.

Figure 5:
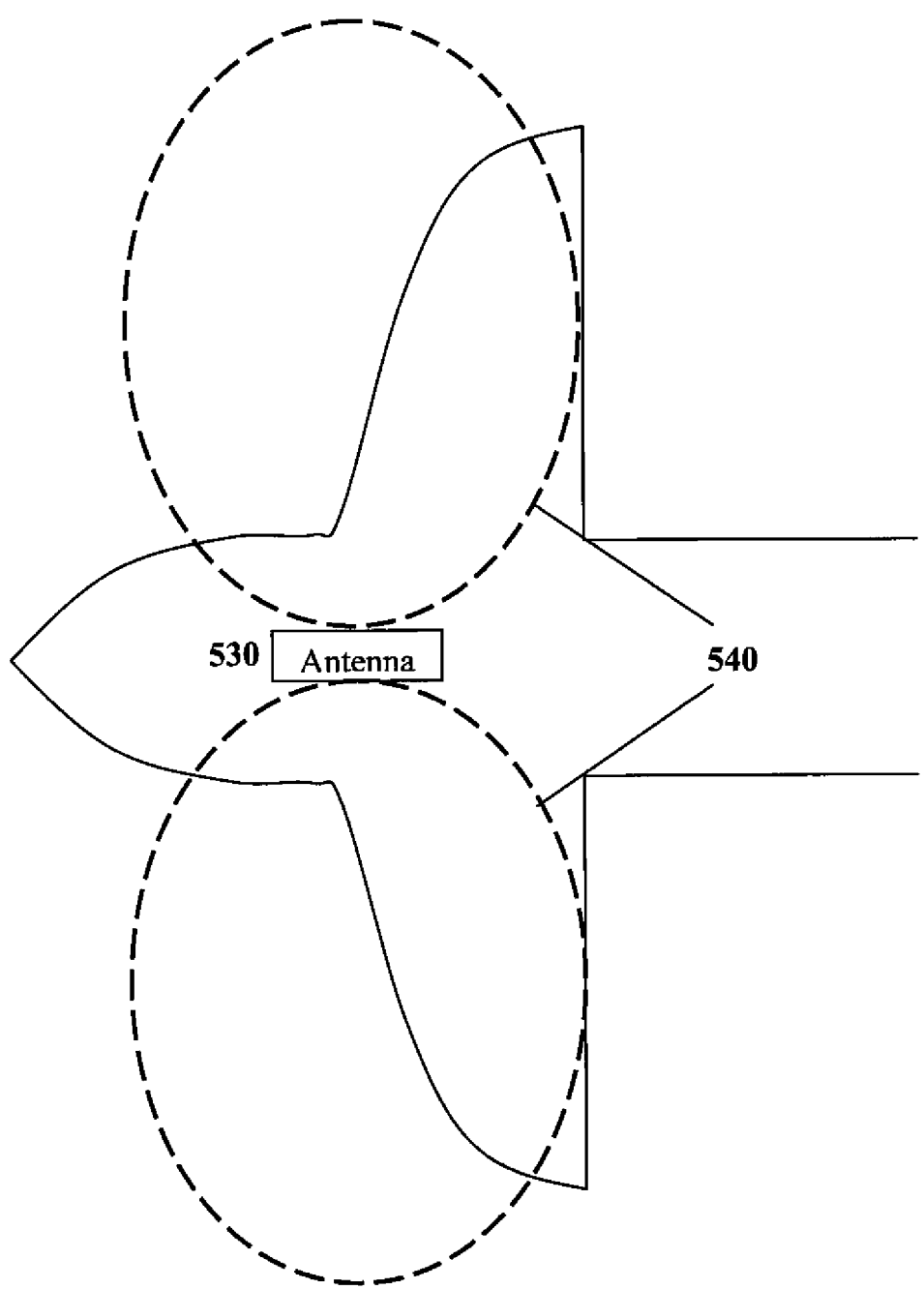
FIG. 5 illustrates a radiation pattern of an aircraft-mounted antenna, in accordance with an embodiment of the present technology.

FIG. 5 illustrates, in cross section, a radiation pattern 540 of an antenna 530 provided in accordance with an embodiment of the present technology. The illustrated cross section is circularly symmetric about the long axis of the antenna, so that the overall radiation pattern 540 is generally toroidal. If the antenna is mounted below the aircraft, the toroidal shape will be truncated by the shielding effect of the aircraft structure and will not cover directions above the aircraft. A dipole antenna may be used to generate such a radiation pattern. Due to the antenna selection and orientation relative to the aircraft (for example the main axis of the dipole antenna is along the axis of the aircraft fuselage), the radiation pattern 540 is substantially matched to the Doppler-feasible region. Similar radiation patterns may be used for wingtip-mounted antennas and/or realized by antenna arrays. Antennas or arrays thereof may be configured to even more closely match the Doppler-feasible region, if desired.

Although aircraft slow down to take off and land, thus generating less Doppler shift during this time, the aircraft is also closer to the ground and usually within terrestrial coverage during this time. Therefore there may be little reason to accommodate operation of the mBTS during these periods of time.

As mentioned above, embodiments of the present technology provide for adjusting operation of the mBTS to avoid interfering with terrestrial portions of the cellular communication network during flyover, and/or to avoid interfering with other nearby mBTSs.

In order to prevent interference with nearby tBTS and/or devices connected thereto, an mBTS may be operated selectively with awareness of their locations, the locations of tBTSs and other mBTSs mounted on other aircraft nearby. Frequency agility may be used by the mBTS to facilitate fitting in with the surrounding BTSs. An mBTS may thus be configured, in response to proximity with another tBTS or mBTS, to adjust its operating frequency, channel coding, modulation, time slot usage, or the like. An mBTS may additionally or alternatively be configured, in response to such proximity, to adjust transmission power or to switch off its transmitter temporarily.

In some embodiments, proximity with other tBTSs or mBTSs may be detected using a knowledge database, which comprises locations of known tBTSs at least along the planned flight path of the aircraft carrying the mBTS. The aircraft navigation systems or a separate GPS may provide a current location of the mBTS, which may then adjust its operation in light of the knowledge database, for example to turn off the antenna, when within a predetermined distance of a known tBTS. In some embodiments, the knowledge database may additionally or alternatively include information regarding the anticipated location of other mBTSs, for example based on filed flight plans thereof.

In some embodiments, the mBTS may be configured to monitor radio channels for evidence of other nearby tBTSs and/or mBTSs. For example, radio channels may be monitored for a beacon or other characteristic signal transmitted by a BTS. Upon detection of a tBTS, the mBTS may be configured to adjust operation accordingly. Upon detection of an mBTS, an arbitration mechanism may be triggered to determine which mBTS to turn off, or both or neither may be turned off.

In embodiments of the present technology, plural mBTSs aboard different aircraft may be configured to avoid using the same frequencies at least when in close proximity. Each mBTS may be configured, prior to flight, to check out one or more frequencies from a pool of available ones based on their host aircraft's flight plan. Different frequencies may be checked out for different portions of the flight path. Since many airliners in many areas are required to file these flight plans, which are often filed electronically, it is possible to generate an accurate estimate of which aircraft will be in a given location at a given time substantially without manual intervention. An mBTS coordination system may be configured to communicate with each mBTS during filing of the flight plan and to assign frequencies for use by different mBTSs, during one or more different portions of the flight path. The flight plan information is made available to the mBTS coordination system for this purpose. In some embodiments, frequency assignments may be given at take off via the cellular network. Assignments may also be updated and changed, if necessary, from a central network control en-route should flight plans change. This would require the mBTS coordination system to be in at least intermittent communication with the mBTS. Alternatively, in the absence of air to ground update capability the mBTS may be configured to inhibit its operation, for example reducing power or shutting down its transceiver, upon a deviation from the filed flight plan, in order to avoid potential interference.

In some embodiments, the mBTS, for example the controller module thereof, may be configured to store all of the flight plan authorizations for aircraft and particularly other mBTSs likely to be in the same region as the mBTS at some time along the flight path. An mBTS may then be configured to make autonomous informed operation decisions, such as frequency assignment, power on/off decisions, and the like based on expected locations of other mBTSs, to thereby avoid interference by inhibiting transmissions for some parts of flights and to avoid overlapping coverage or on the same frequencies.

In some embodiments, the mBTS may receive information such as secondary radar return identifications and collision avoidance information. This information may be used to assist in identifying the potential locations of other mBTSs, thereby facilitating more accurate and immediate co-ordination. In some instances where multiple mBTSs were to change plans without an ability to update each other, interference might still occur. For example, two mBTSs aboard aircraft flying in the same direction and near each other might interfere for a significant period of time. In some embodiments, such scenarios may be avoided or alleviated by using a robust frequency assignment algorithm, or using frequency hopping or the like. Aircraft flying in different directions would likely only interfere for short intervals that may be acceptable. In one embodiment, each mBTS may be configured to listen before transmitting to see if another mBTS is also in the same area and operating on the same frequency.

Figure 6:
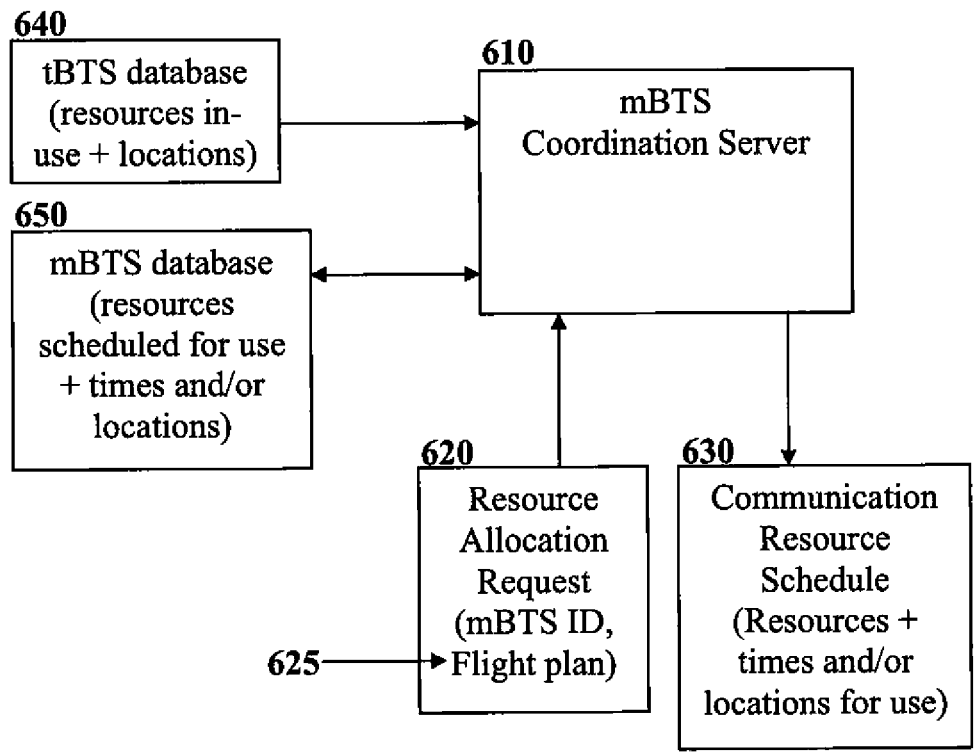
FIG. 6 illustrates a ground-based mBTS coordination system, in accordance with an embodiment of the present technology.

FIG. 6 illustrates a centralized mBTS coordination system provided in accordance with an embodiment of the present technology. The coordination system comprises a server 610 which receives allocation requests 620 from various mBTSs prior to takeoff or during flight. A single centralized server 610 may be used to coordinate regional flights, substantially all continental or even worldwide flights, or a plurality of servers 610 may be used for different regions or originating airports. Different servers may be configured to coordinate when necessary.

Each allocation request comprises an mBTS identifier and a flight plan 625. The flight plan is indicative of the geographic path to be traveled by the mBTS and its host aircraft. The flight plan is further indicative of times at which the mBTS will be at various points along the geographic path. The flight plan may be specified as a sequence of spatial-temporal coordinates, or may be specified in an alternative form, for example as an origin, destination, takeoff time, estimated speed, planned airway usage, planned flight level usage, planned holding patterns, and the like. Other information such as altitude plans, contingency plans, alternative airports, and the like, may also be included.

In response to each allocation request 620, the server 610 provides a communication resource schedule 630. The communication resource schedule 630 comprises an indication of communication resources to be used by the mBTS and times, locations, or both when/where these are to be used. Communication resources may be frequency assignments but may also be other characteristics indicative of physical or logical channels, such as time slots, spreading code allocations, or the like, depending on the communication protocols being used. Furthermore, if the mBTS is capable of using plural radio access technologies, an assigned communication resource may be a particular radio access technology. The schedule may additionally or alternatively specify transmit power levels and/or transmitter turn-off and turn-on events.

The mBTS coordination system may be configured to assign a communication resource schedule 630 to a requesting mBTS in such a way that the mBTS, when following the schedule 630, does not interfere with known operation of tBTSs along the planned flight path. Thus, the schedule 630 may instruct the mBTS to switch frequencies or turn off its transmitter when the aircraft is over certain areas in which a tBTS is known to operate. The mBTS may use location readings such as GPS to detect such areas. Alternatively, time into the flight or deadreckoning may be used to infer location and instruct the mBTS accordingly, although it is considered unlikely that the mBTS would not have access to more direct location readings. The mBTS coordination system may comprise a database 640 of known tBTS locations and associated communication resources to be avoided by mBTSs when proximate to said locations.

In a simple example, the communication resource schedule 630 may comprise a single radio frequency or collection of radio frequencies which may be used by the mBTS for the entire flight. In another example, the communication resource schedule 630 may comprise one or more radio frequencies to be used by the mBTS, except when in proximity to a known tBTS, in which case the mBTS transmitter is temporarily switched off.

The mBTS coordination system may additionally or alternatively be configured to assign a communication resource schedule 630 to a requesting mBTS in such a way that the mBTS, when following the schedule 630, does not interfere with operation of other mBTSs anticipated to be encountered along the flight path. The mBTS coordination system may maintain a database 650 of mBTS trajectories and associated communication resources. For example, the database 650 may comprise information corresponding to previously assigned communication resource schedules, including communication resources and expected time and location of use. The mBTS coordination system is configured to allocate resources to different mBTSs so that the same resource is not used by plural mBTSs during the same time and in the same general area. Communication resources may be "checked out" for certain time windows and locations when assigned to an mBTS. New communication resource schedules may then be assigned so that the "checked out" resources are not assigned twice for the same time window and in the same area.

If the mBTS strays from its flight plan by a predetermined amount, for example spatially, temporally, or both, the mBTS may be configured to utilize a contingency communication resource schedule, which may also have been pre-assigned by the mBTS coordination system. Alternatively, the mBTS may contact the mBTS coordination system and request a revised communication resource schedule. Alternatively, the mBTS may simply shut down its transmitter. The mBTS may additionally send a message to update the database 650.

Figure 7:
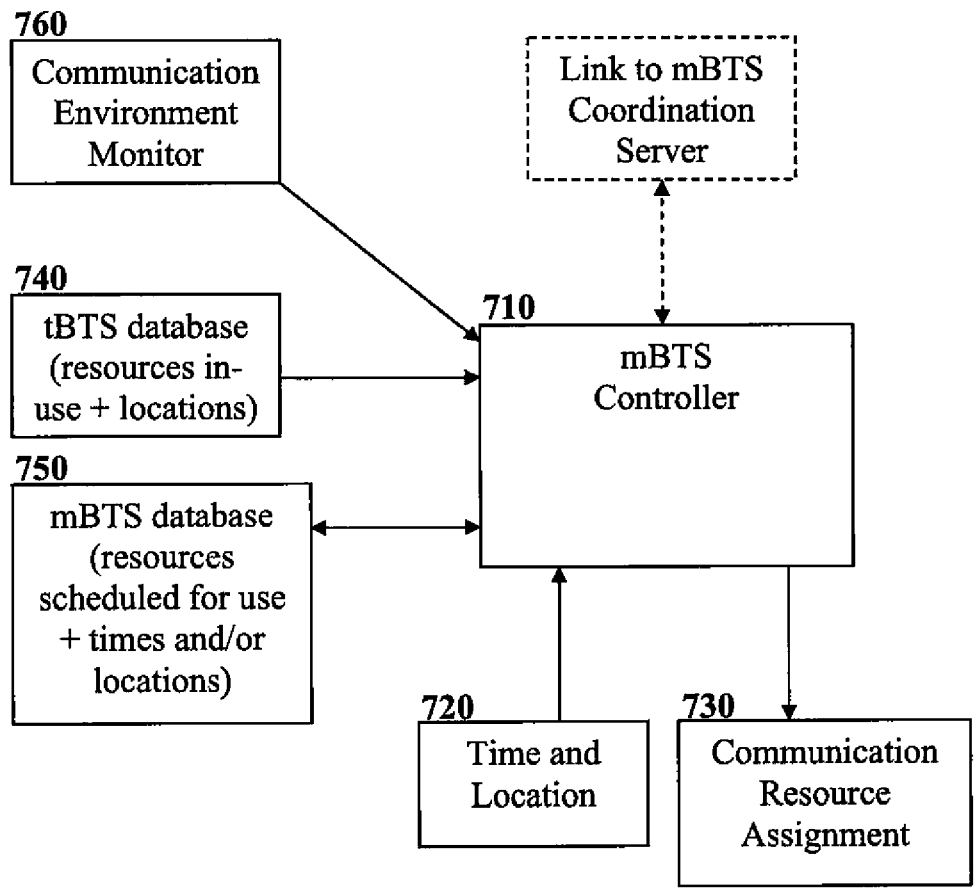
FIG. 7 illustrates communication resource assignment operation of an aircraft-mounted mBTS controller, in accordance with an embodiment of the present technology.

FIG. 7 illustrates communication resource assignment operation of an mBTS controller 710, in accordance with embodiments of the present technology. The resource assignment operation may be performed independently of a communication resource schedule, as a back-up to a communication resource schedule in the case of unplanned flight plan changes or unanticipated encounters with another mBTS, or to refine a communication resource schedule which offers a choice of resources. Assigned communication resources may include one or more of: frequencies, physical or logical channels, time slots, spreading code allocations, radio access technologies, or the like. Transmit power levels and/or transmitter turn-off and turn-on events may also be controlled.

As illustrated, the controller 710 is configured to access on-board or remote databases, including a tBTS database 740 and an mBTS database 750. The tBTS database 740 comprises a repository of communication resources known to be in use by tBTSs at least along the planned flight path, as well as locations, such as locations of the tBTSs and/or regions in which use of these communication resources should be avoided, in order to avoid interfering with tBTS operation. The mBTS database 750 comprises a repository of communication resources known to be in use or scheduled to be in use by other mBTSs at least proximate to the planned flight path of the current mBTS, as well as anticipated locations of the mBTSs and anticipated times that the mBTSs will be in said locations. Additionally or alternatively, the mBTS database may comprise regions and/or times at which use of certain communication resources should be avoided, in order to avoid interfering with other mBTS operations.

During operation, the mBTS controller 710 may be configured to periodically and/or continuously obtain information 720 regarding current time and current location of the mBTS. This information may be used by the controller to query the databases 740 and 750 to determine at least one allocation of communication resources which will not interfere with nearby tBTSs and mBTSs.

Additionally or alternatively to accessing the tBTS database 740 and/or the mBTS database 750, the mBTS controller 710 may be configured to access a communication environment monitor 760. The communication environment monitor 760 is configured to monitor radio channels in order to detect the presence of tBTSs and/or mBTSs within a predetermined range. Upon detection, information such as location, communication resources in use, direction of travel (in the case of an mBTS), or the like, may be provided to the mBTS controller 710, which may adjust operations to avoid interfering with the detected tBTSs and/or mBTSs. If a communication environment monitor 760 is used in place of the databases 740 and 750, current time and location information 720 may not be required. Rather, resource usage decisions may be made in response to the current communication environment.

The mBTS controller 710 is configured to periodically generate communication resource assignments 730, such as channel assignments. A resource assignment 730 may be a command to reduce power to the transceiver or turn off the transceiver for a predetermined time or until further notice. The mBTS may then be reconfigured to utilize the assigned resources until otherwise notified.

In some embodiments, the mBTS may also be configured to service radio devices such as cell phones carried by aircraft passengers. Alternatively, in some embodiments, the mBTS may be configured to specifically detect and deny service to radio devices carried by aircraft passengers, in accordance with airline rules. Detection may be via various methods. For example, if radio signal strength from a device is above a predetermined threshold, if radio signal strength is substantially constant over a period of time, and/or if little or no Doppler shift is detected in a radio signal for a period of time, then that device may be considered to be aboard the aircraft and blocked or given different priority accordingly.

In one embodiment, messages may be forwarded to and/or from radio devices in a multi-hop manner, store-and-forward manner or the like. For example, a message from one remote device may be communicated to an mBTS, stored thereby, and subsequently communicated to another remote device on the expected flight path of another mBTS. The other remote device may then relay the message to a further mBTS, which may in turn communicate it to another remote device for storage or to a target remote device. Alternatively, an mBTS may communicate a message directly to another mBTS when aircraft pass close to each other, or via a backhaul link when available. Routing information and other information such as addressing and time-to-live information may be included in the message.

In some embodiments, messages may be relayed from one aircraft to another, in order to facilitate transmitting a message between a terrestrial radio device and a source or destination device.

It will be appreciated that, although specific embodiments have been described herein for purposes of illustration, various modifications may be made without departing from the scope of the technology. In particular, it is within the scope of the technology to provide a computer program product or program element, or a program storage or memory device such as a non-transitory storage medium, magnetic or optical wire, tape or disc, or the like, for storing signals readable by a machine, for controlling the operation of a computer according to the method of the technology and/or to structure its components in accordance with the system of the technology.

Further, each step of the methods may be executed on a general computer, such as a personal computer, server or the like and pursuant to one or more, or a part of one or more, program elements, modules or objects generated from any programming language, such as C, C++, Java, Perl, PL/1, or the like. In addition, each step, or a file or object or the like implementing each said step, may be executed by special purpose hardware or a circuit module designed for that purpose.

It is obvious that the foregoing embodiments of the technology are examples and can be varied in many ways. Such present or future variations are not to be regarded as a departure from the spirit and scope of the technology, and all such modifications as would be obvious to one skilled in the art are intended to be included within the scope of the following claims.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Persons of ordinary skill in the art will understand that a wide variety of suitable supporting structures and patterns can be readily formed. Any number of longitudinal stiffening ribs or circular ribs could be provided. Thus, the breadth and scope of the present invention should not be limited by any of the above-described exemplary embodiments, but should be defined only in accordance with the following claims and their equivalents.

What is claimed is:

1. A mobile base transceiver station configured to operate as part of a cellular communication network comprising plural terrestrial base transceiver stations and plural terrestrial radio devices, the terrestrial radio devices configured for communication with the mobile base transceiver station and the terrestrial base transceiver stations via a common predetermined protocol, the mobile base transceiver station mounted aboard an aircraft, wherein motion of the aircraft induces a Doppler shift in radio communication between the mobile base transceiver station and one or more of the terrestrial radio devices in range thereof, and wherein operation of the mobile base transceiver station is adjusted in light of said Doppler shift, the mobile base transceiver station further configured to concentrate communication resources toward a set of feasible terrestrial radio devices, said set defined at least in part in that said Doppler shift is below a predetermined threshold.

2. The mobile base transceiver station according to claim 1, wherein the aircraft executes a substantially transient flight pattern.

3. The mobile base transceiver station according to claim 2, further configured to provide transient flyover connectivity to one or more remote terrestrial radio devices.

4. The mobile base transceiver station according to claim 2, wherein the terrestrial radio devices comprise remote machine-type devices.

5. The mobile base transceiver station according to claim 1, wherein an antenna or antenna array of the mobile base transceiver station is configured to have a radiation pattern which is focused toward one or more regions encompassing the set of feasible terrestrial radio devices.

6. The mobile base transceiver station according to claim 5, wherein a first region of the one or more regions is situated in front of the aircraft and a second region of the one or more regions is situated to one or both sides of the first region, at least a portion of the second region adjacent to the first region.

7. The mobile base transceiver station according to claim 5, wherein a first region of the one or more regions is situated below and to the sides of the aircraft and a second region of the one or more regions is situated in front of or behind the aircraft and to the sides of the aircraft, at least a portion of the second region adjacent to the first region.

8. The mobile base transceiver station according to claim 5, wherein a first region of the one or more regions is actively positioned around a predetermined terrestrial radio device.

9. The mobile base transceiver station according to claim 1, further configured to determine an expected membership time for each of one or more members of the set of feasible terrestrial radio devices and to prioritize communication based at least in part on said membership time.

10. The mobile base transceiver station of claim 1, wherein the terrestrial radio devices are configured to adjust operation in light of said Doppler shift.

11. The mobile base transceiver station of claim 10, wherein the terrestrial radio devices are configured to adjust scanning of frequency ranges in light of said Doppler shift.

12. The mobile base transceiver station according to claim 1, further configured to facilitate store-and-forward communication with at least one of the terrestrial radio devices.

13. The mobile base transceiver station according to claim 12, wherein said store-and-forward communication is initiated in response to an emergency communication, and wherein upon receipt of the emergency communication, the mobile base transceiver station is configured to initiate a voice recording for recording emergency information, and to forward the voice recording to facilitate an emergency response.

14. The mobile base transceiver station according to claim 1, further configured to adjust operation to avoid interference with terrestrial portions of the cellular communication network during flyover.

15. The mobile base transceiver station of claim 1, the mobile base transceiver station communicatively coupled to the cellular communication network via one or more of: a satellite link, an Airfone™ link, and an air-to-ground radio link.

16. The mobile base transceiver station of claim 1, further configured to monitor one or more emergency distress frequencies and to report detected emergency distress signals via air traffic control.

17. A mobile base transceiver station configured to operate as part of a cellular communication network comprising plural terrestrial base transceiver stations and plural terrestrial radio devices, the terrestrial radio devices configured for communication with the mobile base transceiver station and the terrestrial base transceiver stations via a common predetermined protocol, the mobile base transceiver station mounted aboard an aircraft, wherein motion of the aircraft induces a Doppler shift in radio communication between the mobile base transceiver station and one or more of the terrestrial radio devices in range thereof, and wherein operation of the mobile base transceiver station is adjusted in light of said Doppler shift, the mobile base transceiver station further configured to: anticipate an amount of Doppler shift observed, in a signal transmitted by the mobile base transceiver station, by one of the plural terrestrial radio devices; and to adjust a transmission frequency to at least partially compensate for said anticipated amount of Doppler shift.

18. A mobile base transceiver station configured to operate as part of a cellular communication network comprising plural terrestrial base transceiver stations and plural terrestrial radio devices, the terrestrial radio devices configured for communication with the mobile base transceiver station and the terrestrial base transceiver stations via a common predetermined protocol, the mobile base transceiver station mounted aboard an aircraft, wherein motion of the aircraft induces a Doppler shift in radio communication between the mobile base transceiver station and one or more of the terrestrial radio devices in range thereof, and wherein operation of the mobile base transceiver station is adjusted in light of said Doppler shift, the mobile base transceiver station further configured to: anticipate an amount of Doppler shift observed, in a signal transmitted by one of the plural terrestrial radio devices, by the mobile base transceiver station, and to adjust monitoring for received signals by the mobile base transceiver station based on said anticipated amount of Doppler shift.

19. A mobile base transceiver station configured to operate as part of a cellular communication network comprising plural terrestrial base transceiver stations and plural terrestrial radio devices, the terrestrial radio devices configured for communication with the mobile base transceiver station and the terrestrial base transceiver stations via a common predetermined protocol, the mobile base transceiver station mounted aboard an aircraft, wherein motion of the aircraft induces a Doppler shift in radio communication between the mobile base transceiver station and one or more of the terrestrial radio devices in range thereof, and wherein operation of the mobile base transceiver station is adjusted in light of said Doppler shift, wherein the mobile base transceiver station is configured to compensate for the induced Doppler shift by adjusting one or more frequencies at which scanning for terrestrial radio devices is performed, said adjusting based at least in part on a speed of the aircraft.

20. A mobile base transceiver station configured to operate as part of a cellular communication network comprising plural terrestrial base transceiver stations and plural terrestrial radio devices, the terrestrial radio devices configured for communication with the mobile base transceiver station and the terrestrial base transceiver stations via a common predetermined protocol, the mobile base transceiver station mounted aboard an aircraft, wherein motion of the aircraft induces a Doppler shift in radio communication between the mobile base transceiver station and one or more of the terrestrial radio devices in range thereof, and wherein operation of the mobile base transceiver station is adjusted in light of said Doppler shift, wherein the mobile base transceiver station is configured to compensate for the induced Doppler shift by adjusting one or both of frequencies at which monitoring for signals from terrestrial radio devices is performed; and frequencies at which the mobile base transceiver station transmits signals to terrestrial radio devices, wherein said adjusting is based at least in part on a speed of the aircraft.

21. The mobile base transceiver station according to claim 20, further configured to facilitate store-and-forward communication with at least one of the terrestrial radio devices.

22. The mobile base transceiver station according to claim 21, wherein said store-and-forward communication is initiated in response to an emergency communication, and wherein upon receipt of the emergency communication, the mobile base transceiver station is configured to initiate a voice recording for recording emergency information, and to forward the voice recording to facilitate an emergency response.

23. The mobile base transceiver station according to claim 20, further configured to adjust operation to avoid interference with terrestrial portions of the cellular communication network during flyover.

24. The mobile base transceiver station according to claim 20, wherein said adjusting is further based at least in part on a rate of change of distance between the mobile base transceiver station and a predetermined ground location comprising or potentially comprising a terrestrial radio device.

25. The mobile base transceiver station of claim 20, the mobile base transceiver station communicatively coupled to the cellular communication network via one or more of: a satellite link, an Airfone™ link, and an air-to-ground radio link.

26. The mobile base transceiver station of claim 20, further configured to monitor one or more emergency distress frequencies and to report detected emergency distress signals via air traffic control.

27. The mobile base transceiver station according to claim 20, wherein the aircraft executes a substantially transient flight pattern.

28. The mobile base transceiver station according to claim 27, further configured to provide transient flyover connectivity to one or more remote terrestrial radio devices.

29. The mobile base transceiver station according to claim 27, wherein the terrestrial radio devices comprise remote machine-type devices.

30. The mobile base transceiver station of claim 20, wherein the terrestrial radio devices are configured to adjust operation in light of said Doppler shift.

31. The mobile base transceiver station of claim 30, wherein the terrestrial radio devices are configured to adjust scanning of frequency ranges in light of said Doppler shift.

32. A method for operating a mobile base transceiver station, the method comprising:
  a) configuring the mobile base transceiver station to operate as part of a cellular communication network, the cellular communication network further comprising plural terrestrial base transceiver stations and plural terrestrial radio devices, the terrestrial radio devices configured for communication with the mobile base transceiver station and the terrestrial base transceiver stations via a common predetermined protocol; and
  b) mounting the mobile base transceiver station aboard an aircraft;
  wherein motion of the aircraft induces a Doppler shift in radio communication between the mobile base transceiver station and one or more of the terrestrial radio devices in range thereof, the method further comprising adjusting operation of the mobile base transceiver station in light of said Doppler shift, the method further comprising configuring the mobile base transceiver station to concentrate communication resources toward a set of feasible terrestrial radio devices, said set defined at least in part in that said Doppler shift is below a predetermined threshold.

33. The method according to claim 32, further comprising configuring an antenna or antenna array of the mobile base transceiver station to have a radiation pattern which is focused toward one or more regions encompassing the set of feasible terrestrial radio devices.

34. The method according to claim 33, wherein the one or more regions are expanded by adjusting transmission frequencies of the mobile base transceiver station to at least partially compensate for said Doppler shift.

35. The method according to claim 32, further comprising configuring the mobile base transceiver station to determine an expected membership time for each of one or more members of the set of feasible terrestrial radio devices and to prioritize communication based at least in part on said membership time.

36. The method according to claim 32, further comprising configuring the mobile base transceiver station to adjust operation to avoid interference with terrestrial portions of the cellular communication network during flyover.

37. The method according to claim 32, further comprising configuring the mobile base transceiver station to adjust operation to avoid interference with other mobile base transceiver stations when within range.

38. A method for operating a mobile base transceiver station, the method comprising:
  a) configuring the mobile base transceiver station to operate as part of a cellular communication network, the cellular communication network further comprising plural terrestrial base transceiver stations and plural terrestrial radio devices, the terrestrial radio devices configured for communication with the mobile base transceiver station and the terrestrial base transceiver stations via a common predetermined protocol; and
  b) mounting the mobile base transceiver station aboard an aircraft;
  wherein motion of the aircraft induces a Doppler shift in radio communication between the mobile base transceiver station and one or more of the terrestrial radio devices in range thereof, the method further comprising adjusting operation of the mobile base transceiver station in light of said Doppler shift, the method further comprising configuring the mobile base transceiver station to compensate for the induced Doppler shift by adjusting one or both of: one or more frequencies at which the mobile base transceiver station transmits signals to terrestrial radio devices, and one or more frequencies at which scanning for terrestrial radio devices is performed, wherein said adjusting is based at least in part on a speed of the aircraft.

39. The method according to claim 38, further comprising configuring the mobile base transceiver station to adjust operation to avoid interference with terrestrial portions of the cellular communication network during flyover.

40. The method according to claim 39, further comprising determining potential interference with terrestrial portions of the cellular communication network by one or more of consulting a geographic database, monitoring radio signals, and obtaining instructions from a coordination system.

41. The method according to claim 38, further comprising configuring the mobile base transceiver station to adjust operation to avoid interference with other mobile base transceiver stations when within range.

* * * * *